(12) United States Patent
Taki et al.

(10) Patent No.: US 7,309,197 B2
(45) Date of Patent: Dec. 18, 2007

(54) INTERNAL GEAR SHAVING MACHINE

(75) Inventors: Hiroki Taki, Amagasaki (JP); Ryoji Yoshida, Amagasaki (JP); Masaaki Yamaguchi, Amagasaki (JP)

(73) Assignee: Kanzaki Kokyukoki MFG. Co., Ltd., Hyogo-ken (JP)

( * ) Notice: Subject to any disclaimer, the term of this patent is extended or adjusted under 35 U.S.C. 154(b) by 33 days.

(21) Appl. No.: 11/432,182

(22) Filed: May 11, 2006

(65) Prior Publication Data

US 2006/0257221 A1 Nov. 16, 2006

(30) Foreign Application Priority Data

May 12, 2005 (JP) .............................. 2005-139327

(51) Int. Cl.
*B23F 19/06* (2006.01)
*B23F 23/04* (2006.01)
*B23F 23/06* (2006.01)

(52) U.S. Cl. .................... 409/6; 409/7; 409/36; 409/37; 409/49; 409/61; 409/62

(58) Field of Classification Search ............... 409/6–9, 409/31, 33–34, 36–37, 49, 58, 61–62, 137
See application file for complete search history.

(56) References Cited

U.S. PATENT DOCUMENTS

| | | |
|---|---|---|
| 2,257,195 A | 9/1941 | Rovick |
| 2,504,578 A | 4/1950 | Pelphrey |
| 3,202,057 A | 8/1965 | Bregi |
| 4,519,733 A * | 5/1985 | Gregg ........................... 409/7 |
| 2003/0145449 A1* | 8/2003 | Lutz ............................ 29/564 |

FOREIGN PATENT DOCUMENTS

| | | |
|---|---|---|
| EP | 0 479 173 A | 4/1992 |
| JP | 61-44527 A | 3/1986 |
| JP | 2002-79422 A | 3/2002 |
| JP | 2003117729 | 4/2003 |

OTHER PUBLICATIONS

European Search Report by European Patent Office on Aug. 29, 2006.

* cited by examiner

*Primary Examiner*—Erica Cadugan
(74) *Attorney, Agent, or Firm*—Knobbe Martens Olson & Bear LLP

(57) ABSTRACT

An internal gear shaving machine 1 which brings a shaving cutter 3 and an internal gear held by a workpiece chuck 2 into engagement with a crossed axes angle, and subjects the tooth flanks of the internal gear to final machining while it rotationally drives at least one of the shaving cutter 3 and the workpiece chuck 2. The workpiece chuck 2 and shaving cutter 3 are supported movably toward and away from each other in a vertical direction with the workpiece chuck 2 higher and supported movably in the horizontal direction relative to each other. The workpiece chuck 3 is constituted to hold the outer circumferential surface of the internal gear with the axis of rotation of the internal gear oriented in a up-down direction so that shavings produced during processing by the shaving cutter can fall downwardly from the internal gear.

29 Claims, 29 Drawing Sheets

(a)

(b)

(a)

(b)

(c)

INTERNAL GEAR SHAVING MACHINE

TECHNICAL FIELD

The present invention relates to an internal gear shaving machine finished by cutting an internal gear with a shaving cutter.

BACKGROUND ART

In known general internal gear shaving machines as disclosed in, for example, Japanese Unexamined Patent Publication No. 2003-117729, an internal gear rotatably supported around a horizontal axis by a workpiece chuck engages a shaving cutter at a predetermined crossed axes angle, and the tooth flanks of the internal gear are finished while at least one of the shaving cutter and the workpiece chuck is rotationally driven.

However, in such a known internal gear shaving machine, shavings produced during shaving disadvantageously remain on the internal teeth of the internal gear and adversely affect the processing accuracy. Moreover, there is a problem of the difficulty in changing the workpiece and the engagement (phasing) of the shaving cutter and the internal gear in changing workpieces.

DISCLOSURE OF INVENTION

Figure 1:
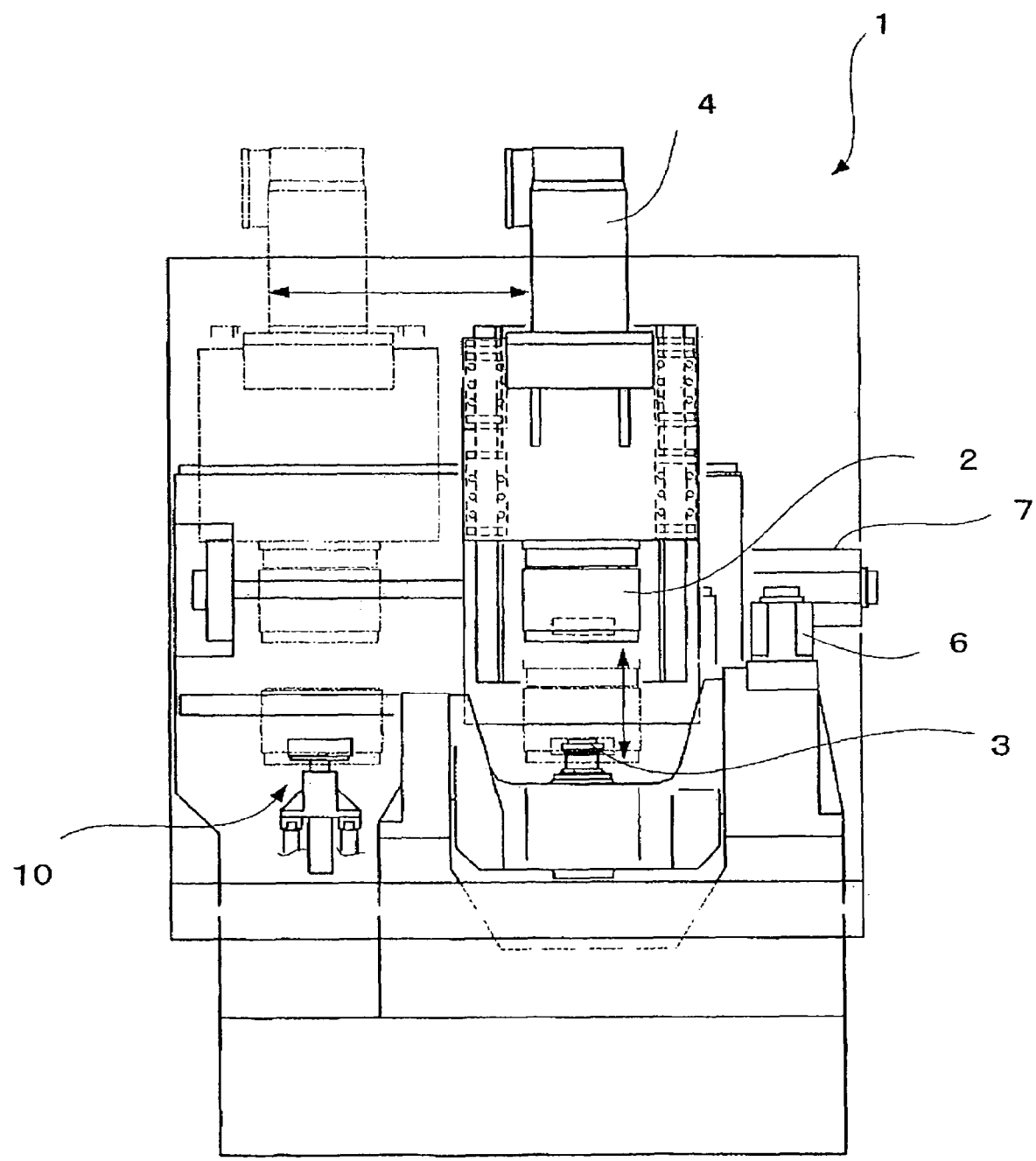
FIG. 1 is a front view showing a first embodiment of an internal gear shaving machine according to the present invention.

An internal gear shaving machine according to the present invention is an internal gear shaving machine in which a shaving cutter engages an internal gear held by a workpiece chuck at a crossed axes angle, and the tooth flanks of the internal gear are subjected to final machining while at least one of the shaving cutter and workpiece chuck is rotationally driven, the internal gear shaving machine being so constituted that the workpiece chuck and shaving cutter are supported movably toward and away from each other in a vertical orientation with the work chuck higher, and are supported movably in the horizontal direction relative to each other, and the workpiece chuck holds the outer circumferential surface of the internal gear so that the axis of rotation of the internal gear is oriented in an up-down direction and shavings produced during processing by the shaving cutter can fall downwardly from the internal gear.

It is preferable that the workpiece chuck is constituted so as to be laterally movably supported and to hold the axis of rotation of the internal gear in a vertical orientation, and further has a workpiece carrying member for changing the workpiece in the lateral position of the workpiece chuck, and that the workpiece carrying member is constituted so that the internal gear is supported with the gear's axis of rotation oriented vertically so that the workpiece chuck can hold the internal gear on the workpiece carrying member from above.

The workpiece chuck is preferably constituted to hold the internal gear with the gear's axis of rotation oriented vertically, and further has a workpiece carrying member for loading the internal gear to a workpiece change position positioned between the workpiece chuck and the shaving cutter and for unloading the internal gear from the workpiece change position, and the workpiece carrying member is constructed so that the internal gear is supported with the gear's axis of rotation oriented vertically so the workpiece chuck can hold the internal gear on the workpiece carrying member from above.

It is preferable that the shaving cutter and the workpiece carrying member each have an indexing element for the internal gear to enable phasing of the shaving cutter and the internal gear held by the workpiece chuck.

Preferably, the workpiece chuck is supported movably in the vertical direction; and the workpiece carrying member has a workpiece loading arm which has a first pivot axis parallel to the axis of rotation of the workpiece chuck and swings between a workpiece change position positioned on the upward and downward travel path of the workpiece chuck and a workpiece loading position laterally remote from the workpiece change position, and a second pivot axis parallel to the axis of rotation of the workpiece chuck, and also a workpiece unloading arm which swings between the workpiece change position and a workpiece removing position laterally remote from the workpiece change position.

The shaving cutter is preferably supported freely swing about the horizontal axis in a manner giving a crossed axes angle with the axis of rotation of the internal gear.

The shaving cutter is preferably supported freely horizontally movable to carry out an incision process on the internal gear at such a position that it enters the internal gear.

It is preferable that a main shaft which rotationally drives the workpiece chuck extends upwardly from the workpiece chuck and a coolant feed hole for providing the internal gear to be processed with a coolant is formed inside the main shaft.

It is preferred that the workpiece chuck is supported freely movably in the vertical direction and the shaving cutter is supported movably in the horizontal direction.

Preferably, the internal gear is loaded in the workpiece change position positioned between the workpiece chuck and the shaving cutter; a workpiece carrying member which unloads the internal gear from the workpiece change position is further provided; the workpiece carrying member has a phasing mechanism which conducts the phasing of the internal gear loaded in the workpiece change position on the workpiece carrying member; and the phasing mechanism has an inner diameter guide member which guides the inner periphery of the internal gear, a phasing pinion which engages the internal gear guided by the inner diameter guide member, a moving mechanism which moves the phasing pinion between a retracted position remote from the internal gear and an engaging position in which it engages the internal gear, and a rotating mechanism which rotates the phasing pinion engaged with the internal gear to a predetermined phase.

The workpiece carrying member has a workpiece loading arm which has a first pivot axis parallel to the axis of rotation of the workpiece chuck and swings between a workpiece change position positioned on the upward and downward travel path of the workpiece chuck and a workpiece loading position laterally remote from the workpiece change position, and the workpiece loading arm preferably comprises the phasing mechanism.

It is preferable that the moving mechanism comprises a first linear actuator and the rotating mechanism comprises a second linear actuator and a conversion mechanism which converts a linear reciprocating motion a moving part of the second linear actuator into a rotary motion of a rotation shaft of the phasing pinion.

The conversion mechanism is preferably a linkage which connects the second linear actuator and the rotation shaft of the phasing pinion.

The phasing mechanism preferably comprises a sensor which detects if the phasing pinion is in the engaging position with the internal gear.

It is preferable that a cutter positioning mechanism which stops the shaving cutter in a predetermined rotation angle position is further provided.

The workpiece chuck is preferably controlled to rotate only to a preliminarily programmed rotation angle so that it engages the shaving cutter positioned by the cutter positioning mechanism after the workpiece whose phase is determined by the phasing mechanism is held.

It is preferable that a workpiece stopper comprising a bearing surface which receives the upper end face of the internal gear in the axial direction with the axis of rotation of the internal gear oriented in the vertical direction is further provided, and a seating sensor which detects the seating of the internal gear is provided on the bearing surface of the workpiece stopper.

The seating sensor preferably comprises a through hole which opens onto the bearing surface of the workpiece stopper and an air gap sensor which is communicably coupled with the through hole.

Preferably, the main shaft which rotationally drives the workpiece chuck extends vertically; the workpiece chuck is a collet chuck; a pull stud which operates the collet chuck is removably connected to the drive shaft; the drive shaft is disposed within the main shaft so that the drive shaft passes through the inside of the main shaft in the axial direction and is supported freely movably upwardly and downwardly with respect to the main shaft; and the through hole is formed within the pull stud and the drive shaft which are in communication with each other.

Preferably, the workpiece chuck is removably attached at the lower end of the main shaft; and a temporary rest which receives the workpiece chuck in a position above the shaving cutter is further provided.

It is preferable that the temporary rest has a rest body and legs provided thereon in a standing condition and that a shoulder for mounting the legs on the shaft case of the shaving cutter is provided.

Preferably, the workpiece chuck is supported freely slidably in the vertical direction and supported on a support driven upwardly and downwardly by a lifting and lowering actuator; the workpiece chuck is covered by a coolant splash guard cover covering the front, left and right sides: and the coolant splash guard cover is supported on the support freely movably in the vertical direction.

The coolant splash guard cover is preferably supported from the lower end of the workpiece chuck in such a manner that the lower end of the cover is downwardly movable beyond the lower end.

It is preferable that the main shaft which rotationally drives the workpiece chuck extends in the vertical direction; a coolant tube passes through the main shaft in the axial direction and is supported non-rotatably about the main shaft's axis; and a coolant discharge opening is oriented in a predetermined direction.

BEST MODE FOR CARRYING OUT THE INVENTION

Examples of the internal gear shaving machines according to the present invention will be described below with reference to the drawings. It should be noted that similar constituent members are referred to by the same numerals, and repeated explanations thereof are omitted throughout all drawings and embodiments.

Figure 2:
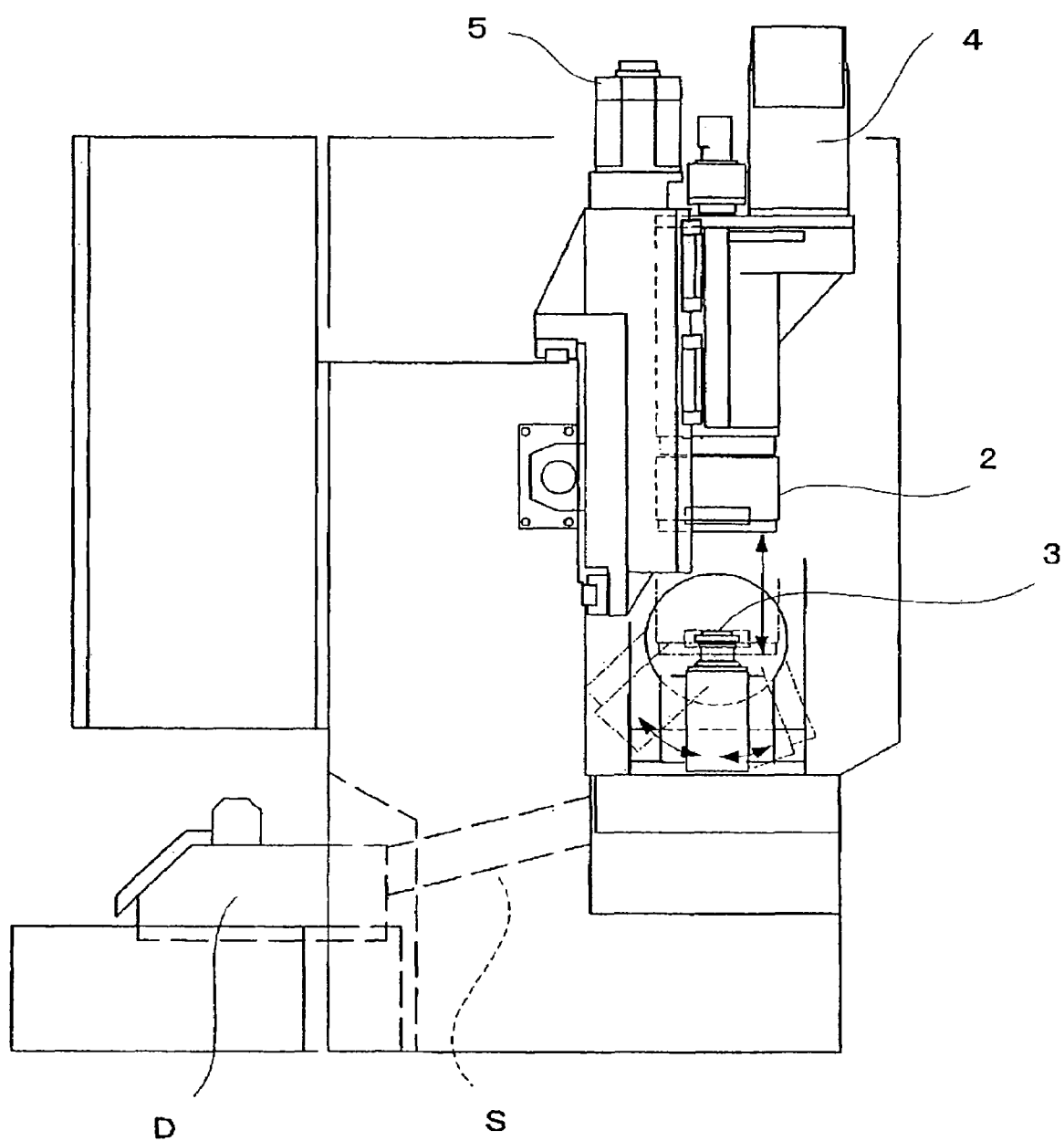
FIG. 2 is a side elevation view of the internal gear shaving machine shown in FIG. 1.
Figure 3:
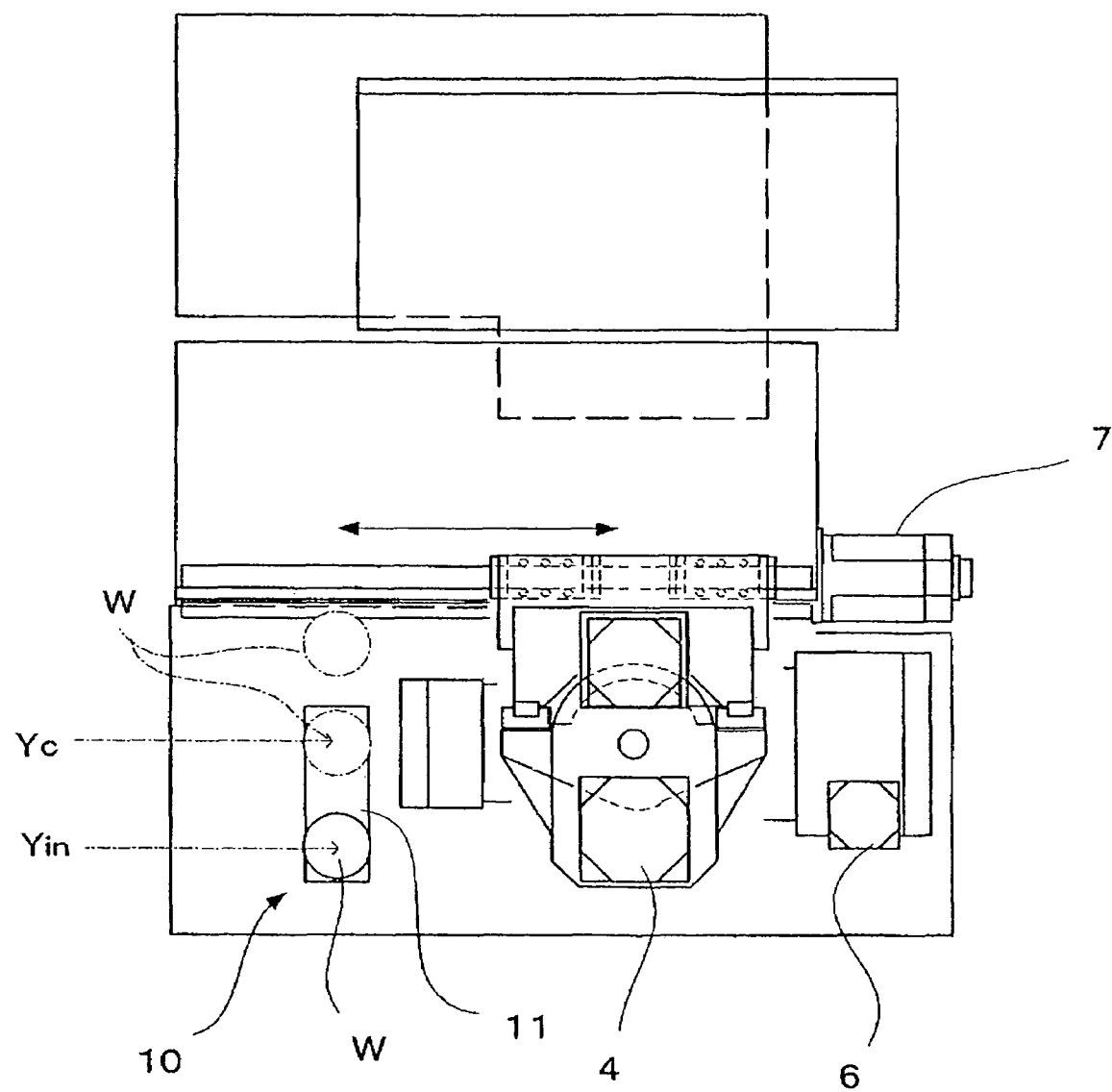
FIG. 3 is a plan view of the internal gear shaving machine shown in FIG. 1.

A first embodiment of an internal gear shaving machine according to the present invention will be described below with reference to FIGS. 1 to 7. FIG. 1 shows a front view of the internal gear shaving machine; FIG. 2 shows a side elevation view; and FIG. 3 shows a plan view, respectively.

An internal gear shaving machine 1 comprises a workpiece chuck 2 that holds an internal gear as a workpiece to be subjected to a shaving process, and a shaving cutter 3 which conducts final machining in engagement with the internal gear.

The workpiece chuck 2 and shaving cutter 3 are disposed in a vertical orientation with the workpiece chuck 2 higher.

The workpiece chuck 2 can be rotationally driven by a spindle motor 4 about the vertical axis, and is supported movably in the vertical direction along with the spindle motor 4 by a lifting and lowering actuator 5. Further, the workpiece chuck 2 is supported laterally and horizontally movably, and is driven by an actuator 7.

The workpiece chuck 2 may be a collet chuck, and the internal gear held by the workpiece chuck 2 has the same axis of rotation as the workpiece chuck 2.

The shaving cutter 3 is supported freely swingably about the center of engagement to be engaged with the internal gear held by the workpiece chuck 2 with a crossed axes angle, swinged by the drive of a driving member 6, and can be stopped at a predetermined swinging angle. In the example shown, the shaving cutter 3 is designed to rotate in response to the rotary drive of the internal gear.

Figure 4:
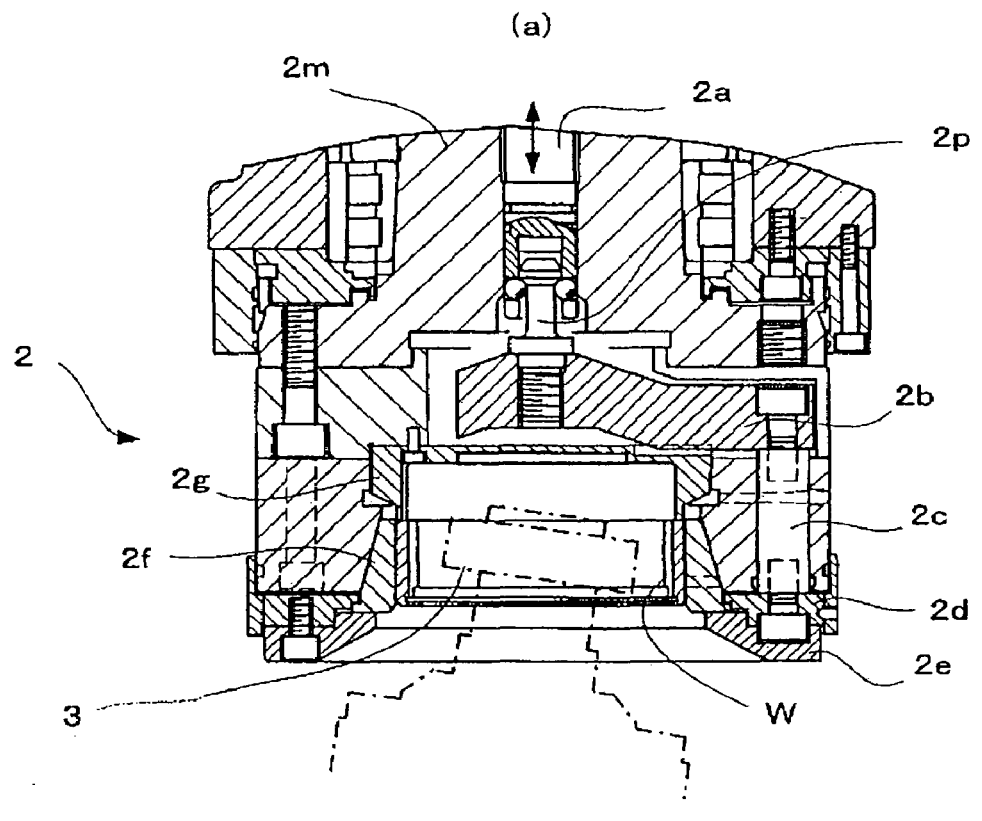
FIG. 4 is longitudinal sectional views which show the internal structure of the workpiece chuck which is a component of the internal gear shaving machine shown in FIG. 1.
Figure 4:
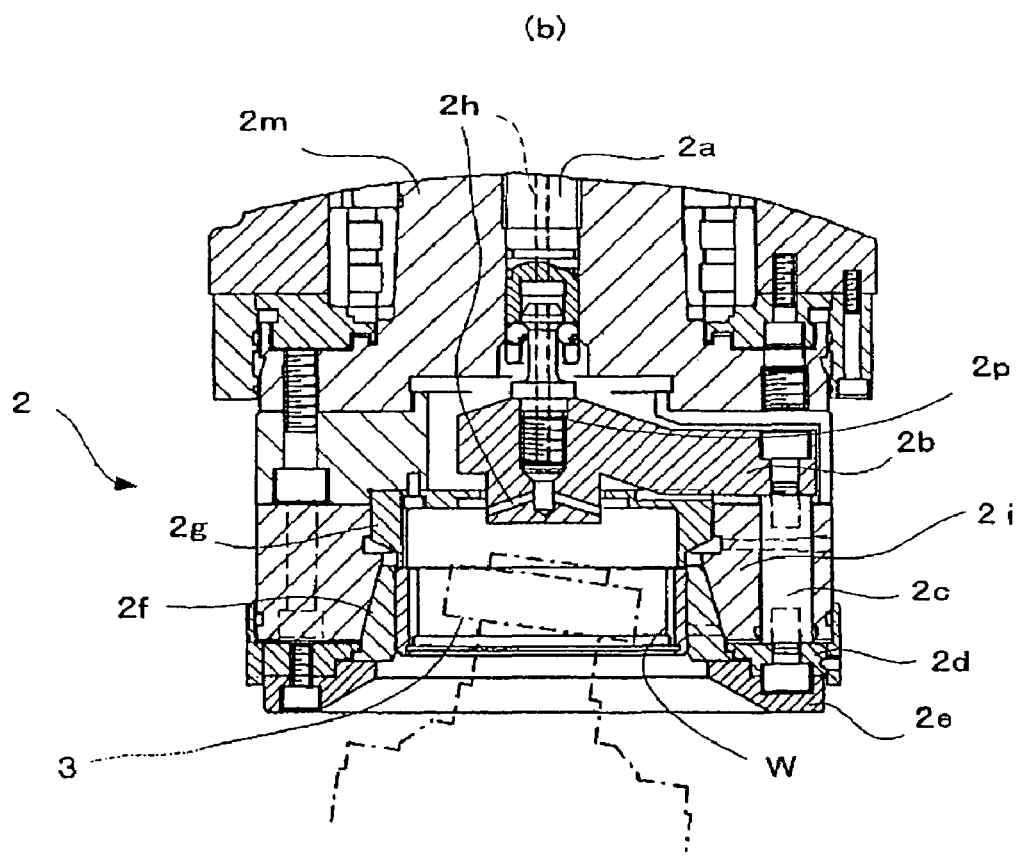

The workpiece chuck 2, as shown in the enlarged cross section of FIG. 4, comprises the following: a drive shaft 2a inserted into a main shaft 2m which supports and rotationally drives the workpiece chuck 2 along the workpiece chuck's axis and which is supported reciprocatingly drivable in the vertical direction relative to the main shaft 2m, a pull stud 2p removably coupled to the drive shaft 2a, an arm 2b screwed to the pull, stud 2p, and collet pinching rings 2d and 2e connected via a connecting rod 2c, a collet 2f which has a slit (not shown) supported circumferentially between the rings 2d, 2e which are expandable and contractable in the radial direction, a workpiece stopper 2g, and a guide member 2i having a tapering inner face which guides the tapering outer surface of the collet 2f.

It should be noted that the workpiece chuck 2 shown in FIG. 4(b) is a modified form of the workpiece chuck 2 shown in FIG. 4(a). In this FIG., a coolant feed hole 2h is formed within the drive shaft 2a and arm 2b so that a coolant can be discharged onto a workpiece W being processed to remove shavings.

Such a workpiece chuck 2 approaches from above the internal gear as the workpiece W, and the collet 2f holds the outer circumferential surface of the internal gear, whereby the shaving cutter 3 is allowed to enter into the internal gear from below. Therefore, the internal gear held by the workpiece chuck 2 opens downwardly because of an opening formed by tooth flanks facing downward.

An internal gear shaving machine 1 having the above constitution conducts a conventional shaving process and the like by swinging the shaving cutter 3 to form a predetermined crossed axes angle with the internal gear as the workpiece W held by the workpiece chuck 2 and moving the workpiece chuck 2 in the vertical direction and in a horizontal direction.

Since the opening of the workpiece, i.e., the internal gear, formed by the tooth flanks faces downward during processing, shavings accordingly fall downward together with coolant during the process, and therefore the shavings do not remain on the internal teeth. Therefore, processing accuracy is improved. The shavings are collected in a dust box D together with coolant via a chute S, and then are separated from coolant by a magnet-type separation device.

A workpiece carrying member 10 is disposed to one side of the workpiece chuck 2. The workpiece carrying member 10 comprises a table 11 which can move horizontally, and loads the internal gear before being processed to a workpiece change position Yc on the horizontal trackway of the workpiece chuck. The table 11 supports the internal gear as the workpiece W on a horizontal plane, whereby the axis of rotation of the supported internal gear is oriented in a vertical direction.

In the workpiece change position Yc, the workpiece chuck 2 receives unprocessed workpiece from the workpiece carrying member 10, and the workpiece carrying member 10 receives processed workpiece from the workpiece chuck 2. In the example shown, the workpiece chuck 2 descends to the workpiece change position to hold and release the workpiece, and then ascends and further moves horizontally to return to the process position.

A workpiece change operation of the first embodiment will be described below with reference to the plan view of FIG. 5.

The workpiece carrying member 10 of the example shown can place two workpieces on the horizontal plane of the table 11. The table 11 has an unprocessed workpiece rest 10a positioned on the front side (lower side of FIG. 5) and a processed workpiece rest 10b positioned further back on the table (upper side of FIG. 5).

FIG. 5(a) shows a state wherein the unprocessed workpiece rest boa is positioned at a workpiece loading position $Y_{in}$ and the unprocessed workpiece W is placed on the rest, while the processed workpiece rest 10b is at the workpiece change position and is ready to receive a processed workpiece.

The workpiece change position Yc is located on the horizontal trackway (H) of the workpiece chuck 2. In contrast, the workpiece loading position $Y_{in}$ is remote from the horizontal trackway of the workpiece chuck 2, and in the example shown, is positioned to the front (lower side of FIG. 5) of the workpiece change position Yc.

Figure 5:
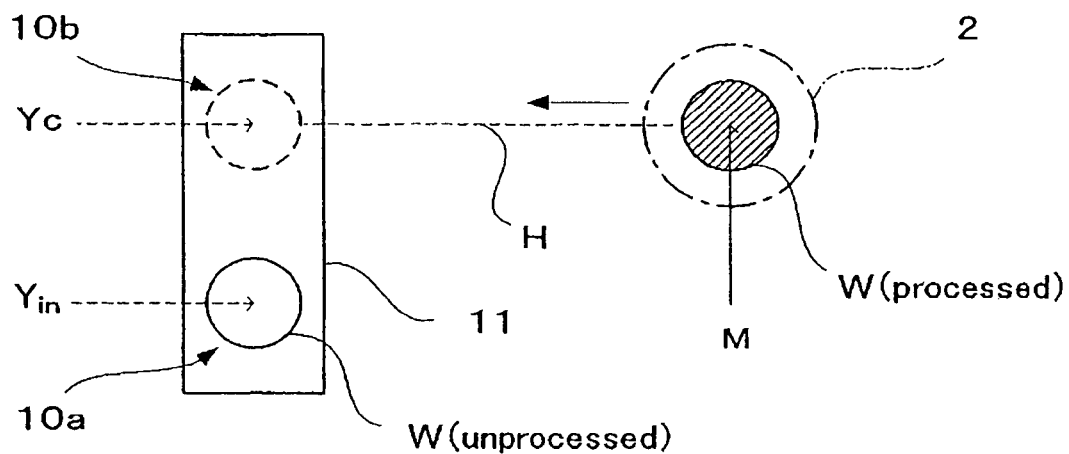
FIG. 5 is plan views showing the workpiece carrying member which is a component of the internal gear shaving machine of FIG. 1.
Figure 5:
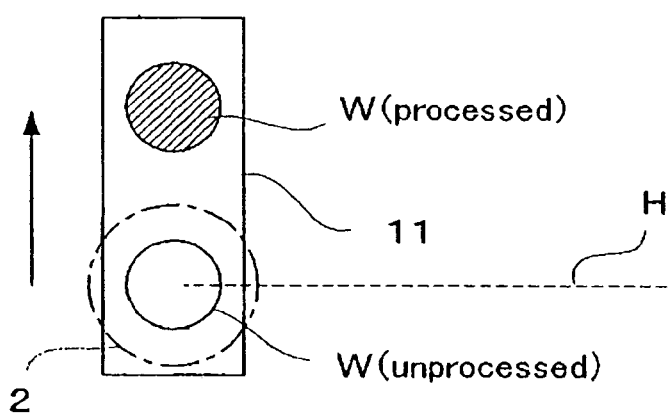
Figure 5:
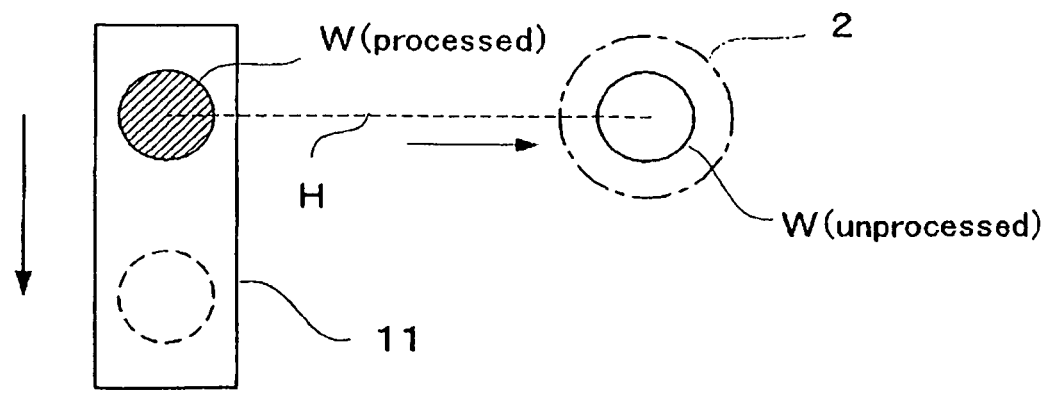

In FIG. 5(a), the unprocessed workpiece W is placed on the unprocessed workpiece rest 10a located at the workpiece loading position $Y_{in}$. The workpiece chuck 2 holds the processed workpiece W, horizontally moves from a process position M to the side (left side of FIG. 5) of the workpiece change position, and transfers the processed workpiece to the workpiece change position Yc. The workpiece chuck 2 descends to the workpiece change position Yc, releases the processed workpiece and places it on the processed workpiece rest 10b, and temporarily ascends and waits over the workpiece change position.

Subsequently, as shown in FIG. 5(b), the table 11 moves horizontally in the direction perpendicular to the horizontal movement of the workpiece chuck 2 (upper side in FIG. 5) so that the unprocessed workpiece W on the unprocessed workpiece rest 10a is positioned at the workpiece change position Yc. The workpiece chuck 2 waiting over the workpiece change position Yc is then lowered again to hold the unprocessed workpiece W and ascends. After the workpiece chuck 2 holds the unprocessed workpiece W and ascends, as shown in FIG. 5(c), the workpiece chuck 2 horizontally moves to return to the process position, while the table 11 returns to the position as it is in FIG. 5 (a), the processed workpiece W is taken out from the workpiece change position Yc, and an unprocessed workpiece is loaded onto the unprocessed workpiece rest 10a at the workpiece loading position $Y_{in}$. The workpiece is thus changed.

A workpiece carrying member having the above constitution allows the workpiece W to be mounted and changed on the horizontal plane. Therefore, loading and removal of the workpiece are easier than in known internal gear shaving machines in which the rotation shaft of the workpiece is oriented in the horizontal direction, facilitating the changing of the workpiece.

It should be noted that the workpiece carrying member may be so constituted that the table 11 turns about the midpoint between the workpiece loading position $Y_{in}$ and the workpiece change position Yc as a rotational center instead of moving horizontally as mentioned above so that the positions of a processed workpiece and an unprocessed workpiece can be interchanged.

The workpiece carrying member 10 may comprise an indexing element for an unprocessed workpiece on the unprocessed workpiece rest 10a. The indexing element may comprise, for example, a positioning pin or a position sensor provided on the table 11.

Figure 6:
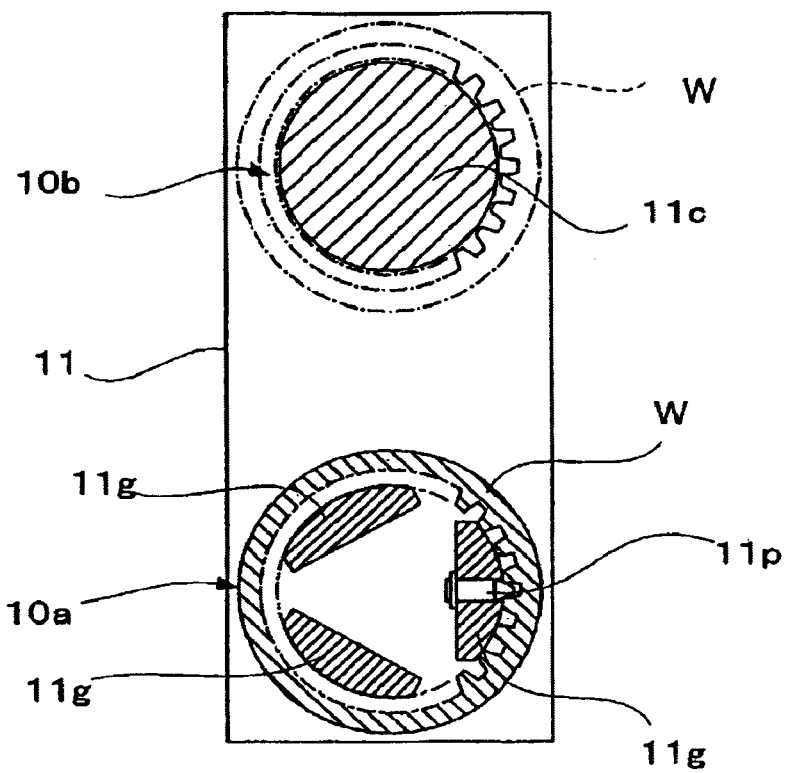
FIG. 6 is a plan view showing an example of an indexing element of the workpiece carrying member which is a component of the internal gear shaving machine of FIG. 1.

FIG. 6 is a plan view showing an example of an indexing element of a workpiece carrying member comprising a positioning pin. The table 11 comprises three guide members 11g which contact the tooth tips of the internal gear, i.e., the workpiece W on the unprocessed workpiece rest 10a, in three directions and determines the center axis position of the internal gear, and a positioning pin 11p provided in one of the guide members 11g in a manner of protruding outwardly for engaging a tooth groove of the internal gear as the workpiece W so that it can determine the positions of the internal teeth. The processed workpiece rest 10b has no positioning pin for determining the position of an internal teeth, but has a cylindrical protrusion 11c for determining the center axis position of the internal gear positoned thereon.

The workpiece chuck 2 holds the workpiece W positioned in a predetermined position by the positioning pin 11p, and returns to the processing position while maintaining the state of held in position. Since the internal teeth position of the internal gear, i.e., the workpiece W, is known in advance due to the positioning pin 11p, the shaving cutter 3 is indexed in advance to allow the shaving cutter 3 to smoothly engage the internal teeth of the internal gear held by the workpiece chuck 2.

Although the shaving cutter 3 is not forcefully driven during processing in the example shown, for the purpose of positioning, an indexing element can be provided so that the teeth of the shaving cutter can be stopped at a predetermined phase. For example, a phasing pin which is engageable with the rotation shaft of the shaving cutter can be provided (refer to FIG. 18), or a servomotor (not shown) can be provided in the inside, etc. In this manner, phasing of the shaving cutter 3 and the internal gear held by the workpiece chuck 2 is carried out.

Figure 7:
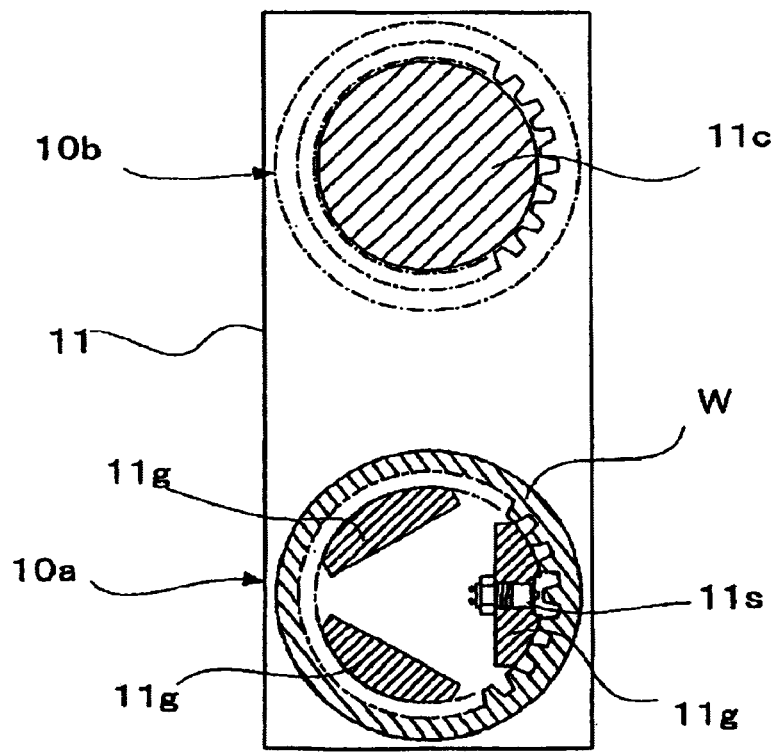
FIG. 7 is a plan view showing another example of an indexing element of the workpiece carrying member which is a component of the internal gear shaving machine of FIG. 1.
Figure 8:
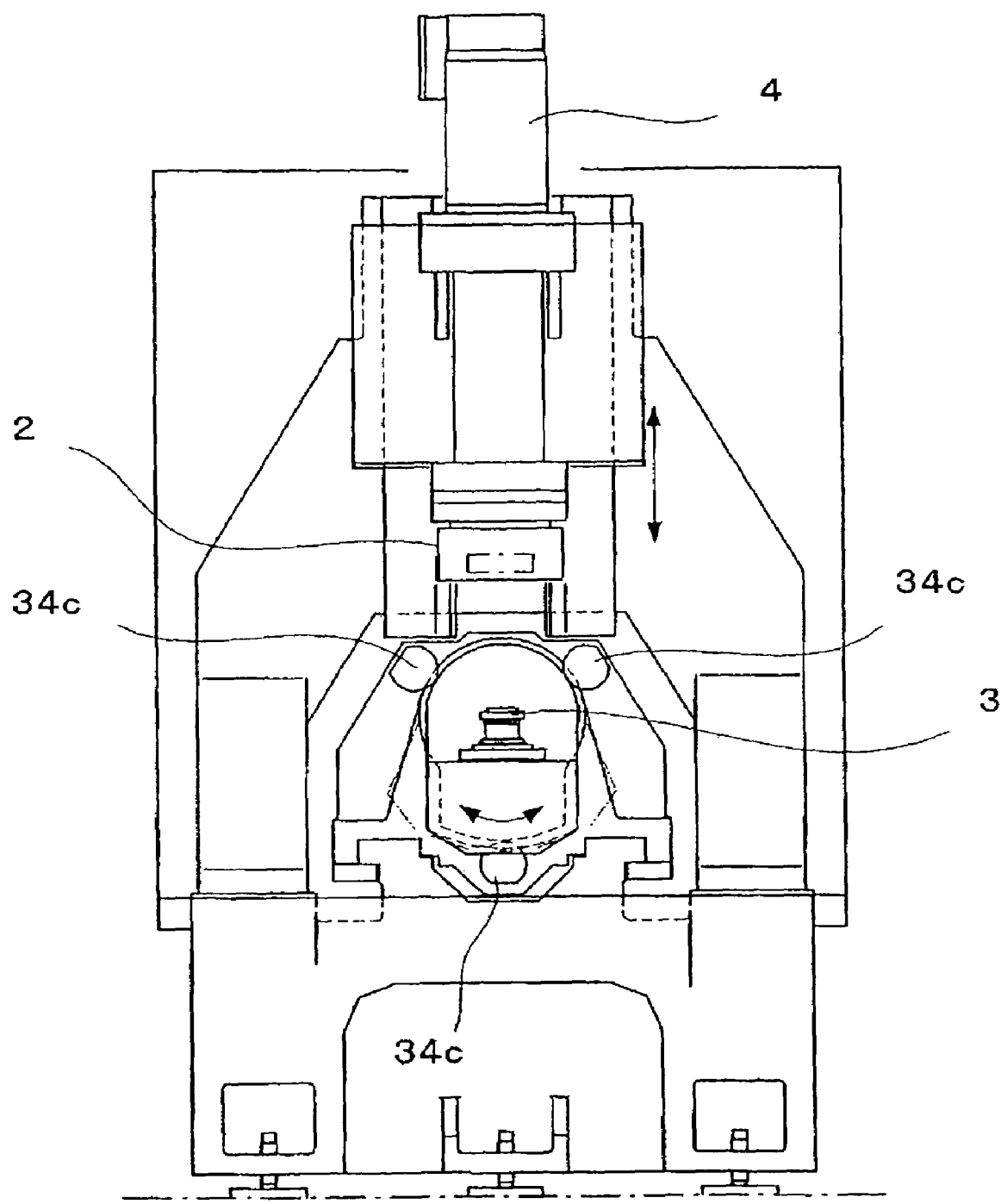
FIG. 8 is a front view showing a second embodiment of an internal gear shaving machine according to the present invention.
Figure 9:
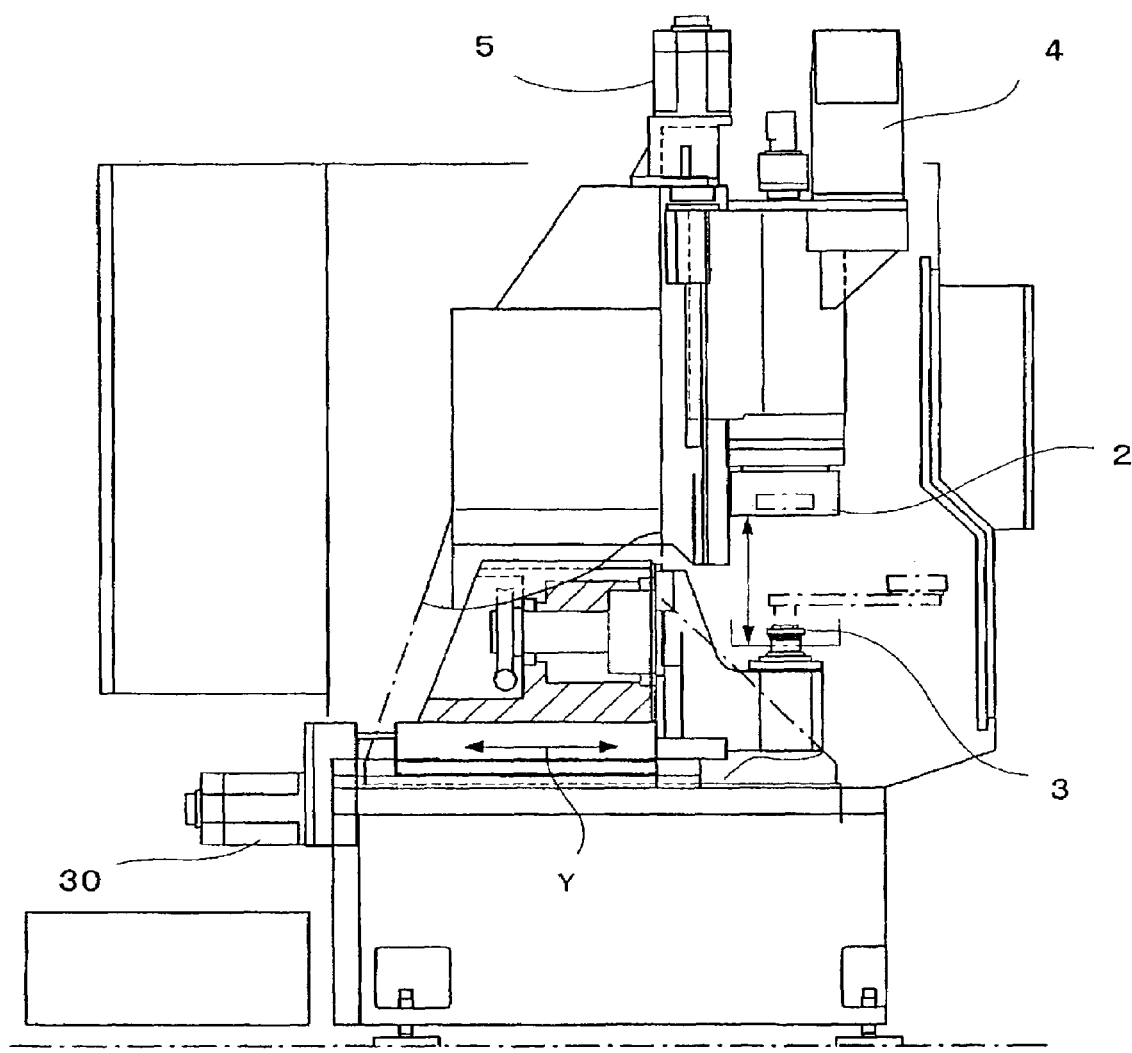
FIG. 9 is a side elevation view of the internal gear shaving machine shown in FIG. 8.
Figure 10:
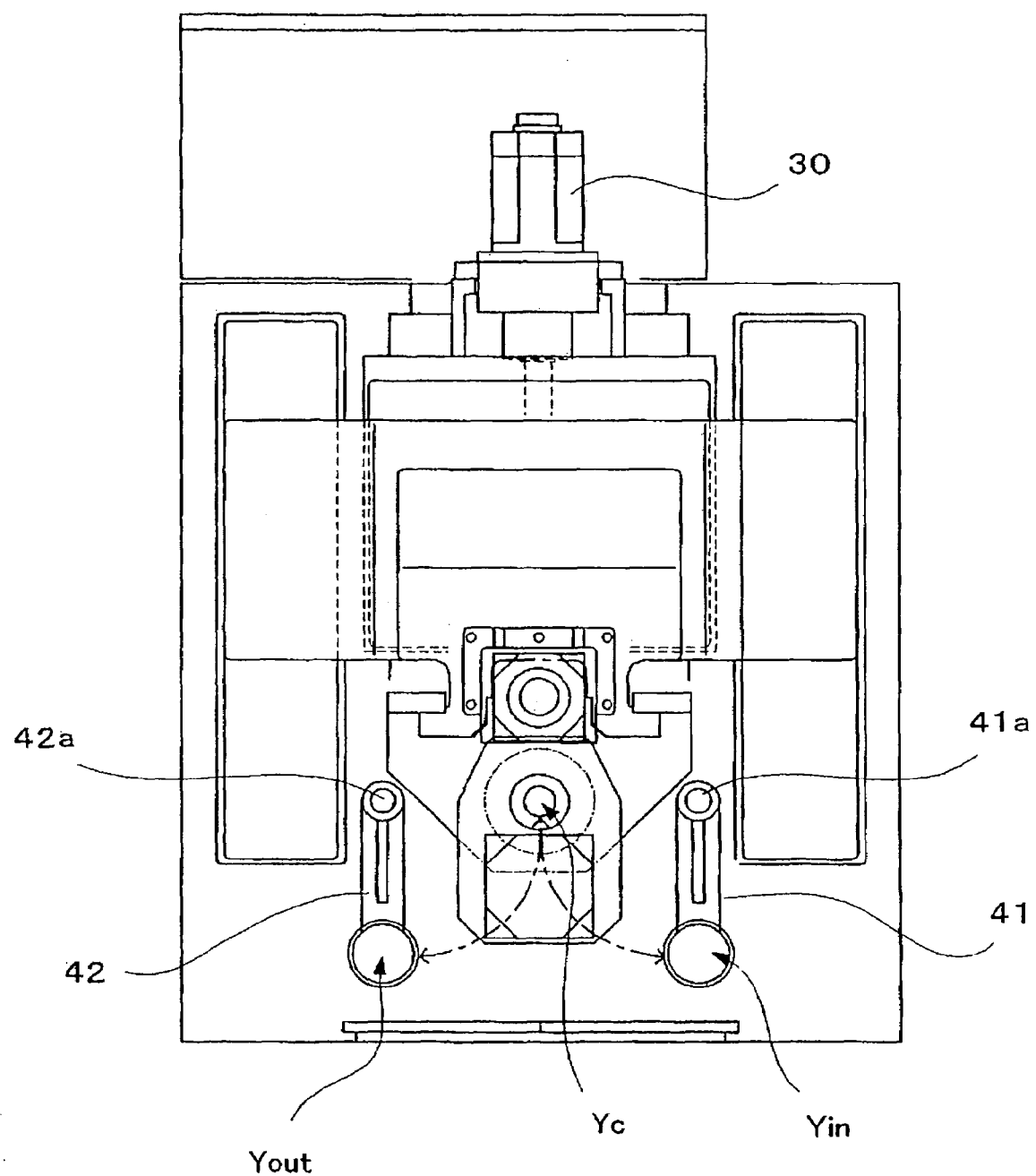
FIG. 10 is a plan view of the internal gear shaving machine shown in FIG. 8.

FIG. 7 is a plan view showing an example of an indexing element of the workpiece carrying member comprising a proximity sensor. In the indexing element of FIG. 7, a proximity sensor 11s is provided instead of the positioning pin of the indexing element of FIG. 6. The proximity sensor 11s can detect positional information (phase information) of an internal tooth located in a position opposing the proximity sensor 11s by detecting whether a tooth exists within an operational distance or not. The positional information about the tooth position detected by the proximity sensor 11s is sent to a control apparatus, which is not shown in the Figure, and the control apparatus rotates the servomotor of the shaving cutter by a predetermined rotation angle to match the phases of the tooth position of the internal gear held by the workpiece chuck 2 and the tooth position of the shaving cutter 3, realizing smooth engagement.

As mentioned above, the workpiece carrying member 10 and the shaving cutter 3 each has an indexing element, whereby engagement (phasing) of the shaving cutter and internal gear when changing a workpiece is carried out.

Subsequently, a second embodiment of the internal gear shaving machine according to the present invention is described below with reference to FIGS. 8 to 13. It should be noted that some constitutent members similar to those in the above first embodiment are referred to by the same numerals and detailed explanations thereof are omitted.

The internal gear shaving machine of the second embodiment, as in the above first embodiment, comprises a workpiece chuck 2 and a shaving cutter 3 supported movably toward and away from each other in a vertical orientation with the workpiece chuck 2 higher, and are supported movably in the horizontal direction relative to each other. The workpiece chuck 2 holds the internal gear to orient the axis of rotation of the internal gear to a vertical direction in a manner to open downwardly so that shavings produced during the process by the shaving cutter can fall downwardly from the internal gear.

The workpiece chuck 2 is capable of moving upwardly and downwardly by a lifting and lowering actuator 5 in a vertical direction. The shaving cutter 3 is swingably supported about the center of engagement, caused to swing about the horizontal axis by a driving member (not shown) to give an crossed axes angle as shown with an arrow R in FIG. 1, and is made movable in the horizontal direction (Y direction in FIG. 9) by a driving member 30. In the example shown, the shaving cutter 3 is designed to rotate in response to the rotational drive of the internal gear.

Figure 11:
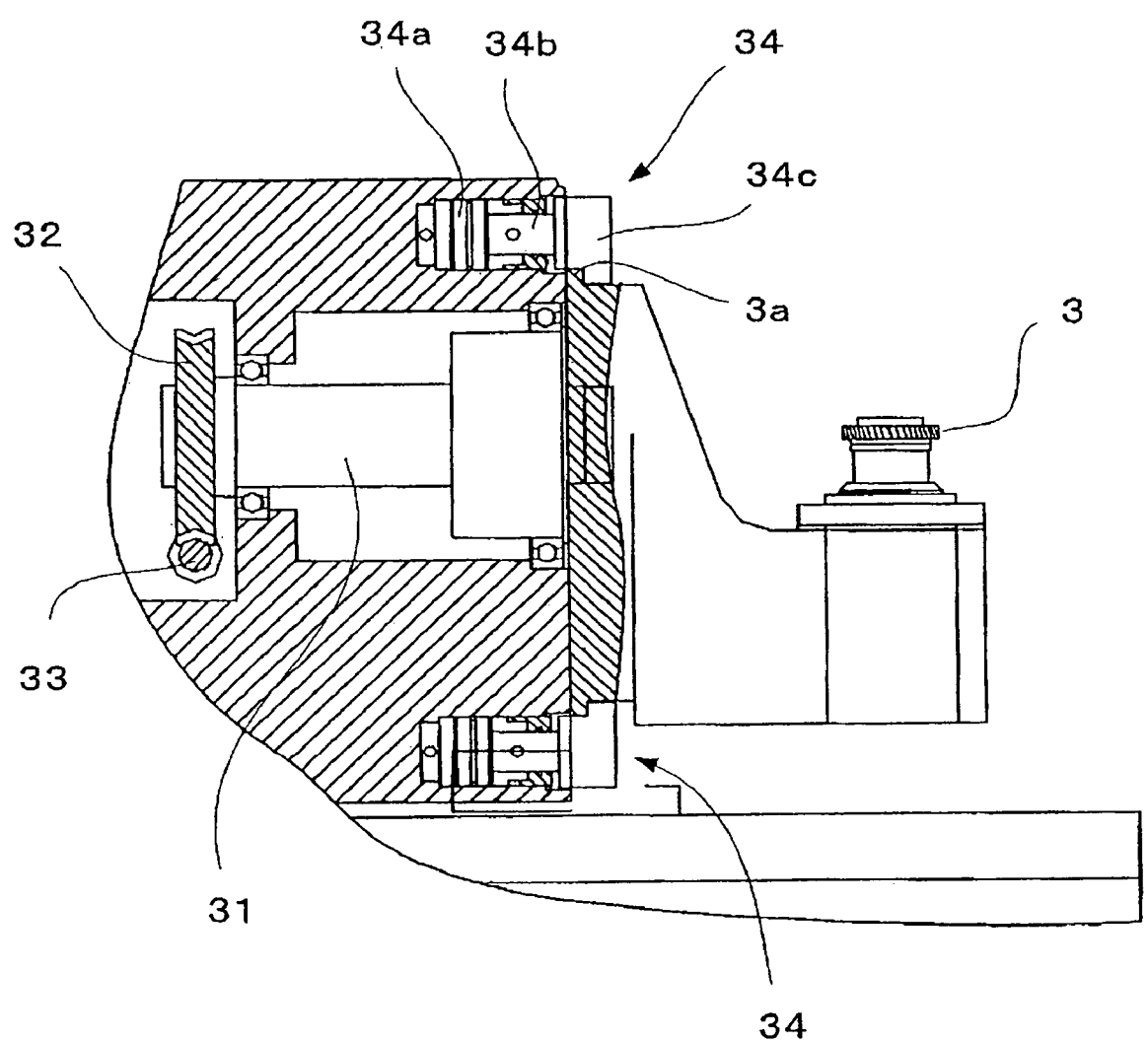
FIG. 11 is a partly sectioned view showing the inner structure of a swinging member of a shaving cutter head which is a component of the internal gear shaving machine of FIG. 8.

FIG. 11 is a longitudinal sectional view showing the details of the shaving cutter 3. FIG. 11 illustrates a swing shaft 31 for swinging the shaving cutter 3, a worm wheel 32 fixed at the rear end of the swing shaft 31, and a worm 33 engaging the worm wheel 32.

Further, a clamping apparatus 34 for fixing the shaving cutter 3 at a desired swinging angle is shown in FIG. 11. The clamping apparatus 34 has a piston 34a driven by hydraulic pressure, a piston rod 34b fixed on the piston 34a, and a clamper 34c connected to the tip of the piston rod 34c. The clamper 34c presses a peripheral flange portion 3a of the shaving cutter 3, and can set the shaving cutter 3 at a desired swinging angle and then fix it.

The workpiece carrying member of the second embodiment has a workpiece loading arm 41 and a workpiece unloading arm 42.

The workpiece loading arm 41 is supported freely swingably around a first pivot axis 41a parallel to the axis of rotation of the workpiece chuck 2, and swings between a workpiece change position Yc positioned on the travel path of the workpiece chuck 2 in the vertical direction and a workpiece loading position $Y_{in}$ remote from this workpiece change position toward the right front.

The workpiece unloading arm 42 is supported freely swingably around a second pivot axis 42a parallel to the axis of rotation of the workpiece chuck 2, and swings between the workpiece change position Yc and a workpiece removing position $Y_{out}$ remote from the workpiece change position Yc toward the left front.

The workpiece loading arm 41 supports the internal gear with its axis of rotation oriented in the vertical direction so that the workpiece chuck 2 can hold the internal gear on the workpiece loading arm 41 from above.

Figure 12:
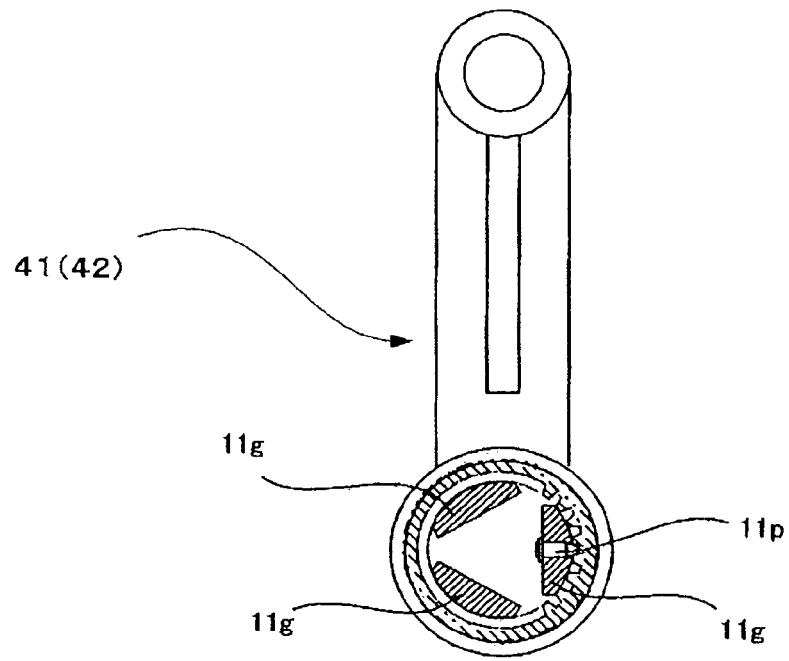
FIG. 12 is a plan view showing an example of an indexing element of a workpiece carrying member which is a component of the internal gear shaving machine shown in FIG. 8.
Figure 13:
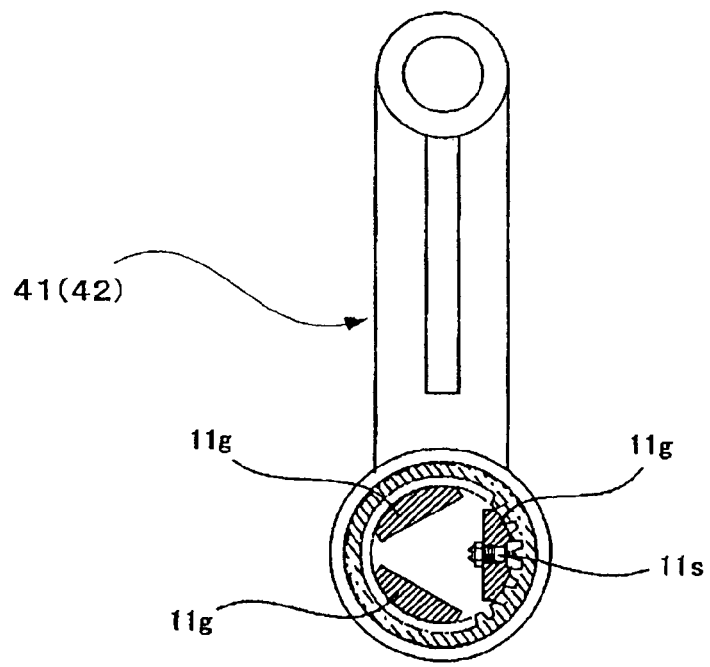
FIG. 13 is a plan view showing another example of an indexing element of the workpiece carrying member which is a component of the internal gear shaving machine shown in FIG. 8.

The workpiece loading arm 41 may comprise an indexing element for the internal gear i.e., the workpiece W. An indexing element having a constitution similar to that shown in the above first embodiment can be employed. FIG. 12 shows an example using a positioning pin 11p, and FIG. 13 shows an example using a proximity sensor 11s.

Changing and processing of a workpiece are carried out in the following manner. To begin with, when a workpiece is loaded in the workpiece loading position $Y_{in}$, the workpiece loading arm 41 swings to the workpiece change position and loads the workpiece. The workpiece chuck 2 then descends to hold the workpiece on the workpiece loading arm 41. Thereafter, the workpiece chuck 2 ascends to such a position that does not interfere with the workpiece loading arm 41, and the workpiece loading arm 41 swings to return to the workpiece loading position. The workpiece chuck 2 descends again to engage the workpiece with the shaving cutter 3. The shaving cutter 3 swings about the horizontal shaft to form a desired crossed axes angle with the workpiece. Since the workpiece chuck 2 forcefully and rotationally drives the workpiece, the shaving cutter 3 rotates in response to the rotation of the workpiece. This causes the workpiece chuck 2 to move in the vertical direction, and a finishing process such as a crowning process is carried out by causing the shaving cutter 3 to move in the horizontal direction.

After the finishing process is completed, the wrokpiece chuck 2 rotates the shaveing cutter 3 via the work to a disirable phase in which the phasing pin 3p engages with the latching recess 3c. After the wrorkpiece chuck 2 is stopped, when the workpiece chuck 2 ascends and moves away from the shaving cutter 3, the workpiece unloading arm 42 swings to the workpiece change position Yc positioned in a space between the workpiece chuck 2 and the shaving cutter 3 to prepare to receive the processed workpiece. When the workpiece chuck 2 descends and the workpiece unloading arm 42 receives the processed workpiece from the workpiece chuck 2, the workpiece chuck 2 ascends to such a position that it does not interfere with the workpiece unloading arm 42, and then the workpiece unloading arm 42 swings to unload the processed workpiece from the workpiece change position Yc to the workpiece removing position $Y_{out}$.

A third embodiment of the internal gear shaving machine according to the present invention is described below with reference to FIGS. 14 to 28. It should be noted that FIGS. 14 to 16 correspond to FIGS. 1 to 3.

Although not illustrated in the first and second embodiments, the entire front face and side face of the entire apparatus are covered with a body cover 70 as shown in FIGS. 1 to 3 with chain lines. Numeral 70a in FIGS. 1 to 3 represents an opening and closing viewing window in the body cover 70.

Figure 18:
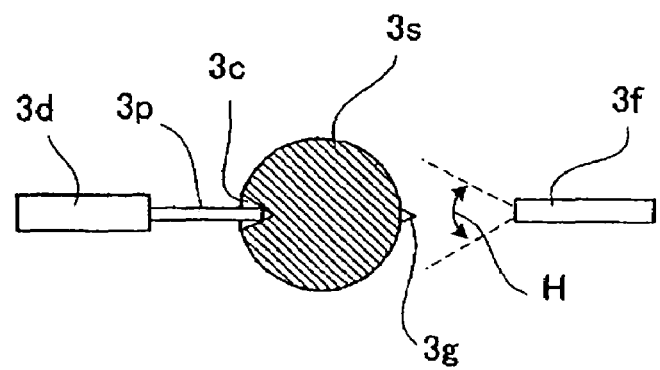
FIG. 18 is a cross-sectional view taken along line 18-18 of FIG. 17.

The internal gear shaving machine comprises a cutter positioning mechanism for stopping a shaving cutter 3 at a predetermined rotation angle position about its spindle shaft. The cutter positioning mechanism can comprise, for example, as shown in FIG. 18, a latching recess 3c formed on a spindle shaft 3s of the shaving cutter 3, and a phasing pin 3p which operates engageably and disengageably with the latching recess 3c by an air cylinder 3d. Moreover, a projection 3g is formed on the spindle shaft 3s so that this projection 3g can be detected by a proximity sensor 3f.

Figure 14:
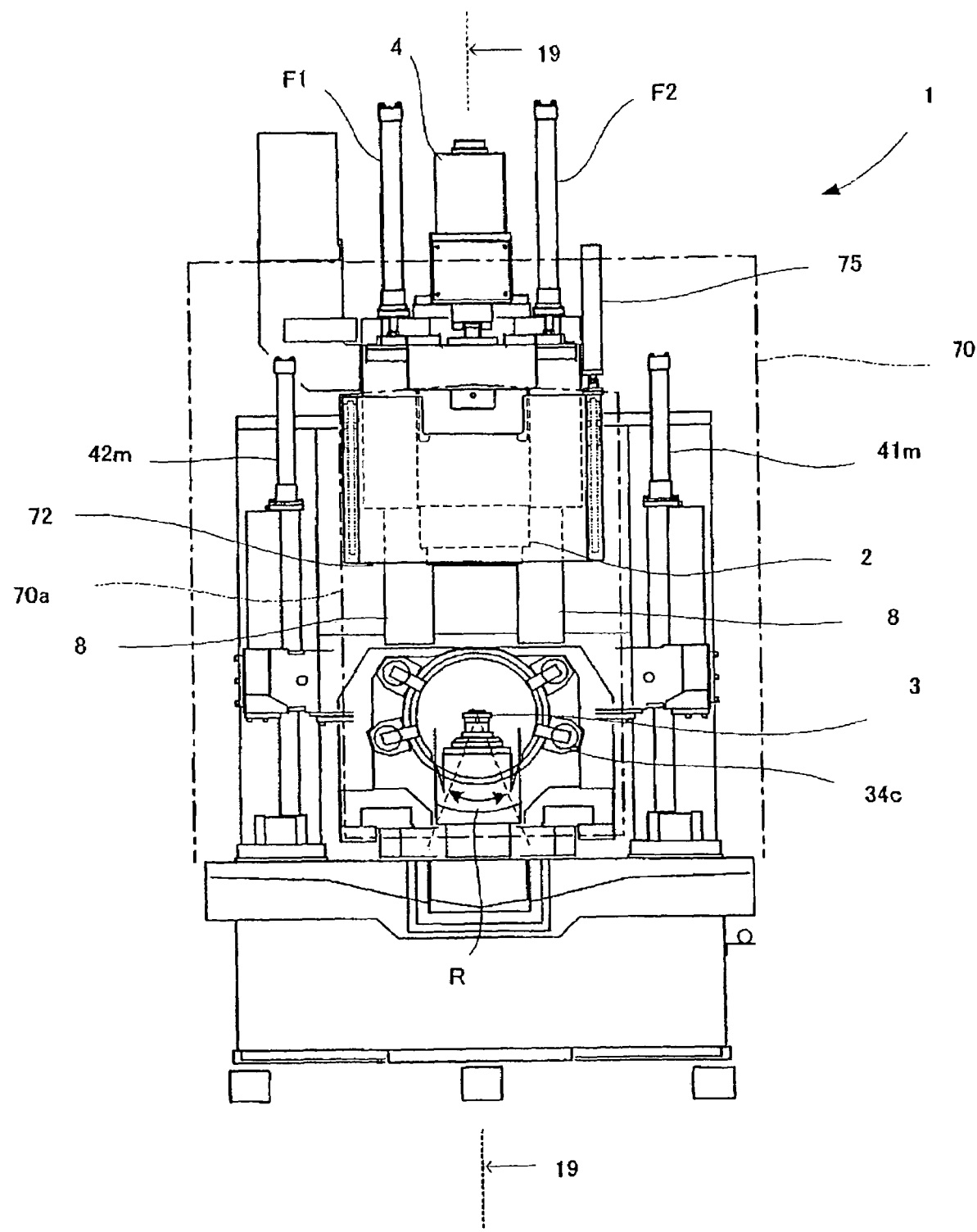
FIG. 14 shows an embodiment of an internal gear shaving machine according to the present invention, and is a front view corresponding to that viewed along line 14-14 of FIG. 16.
Figure 15:
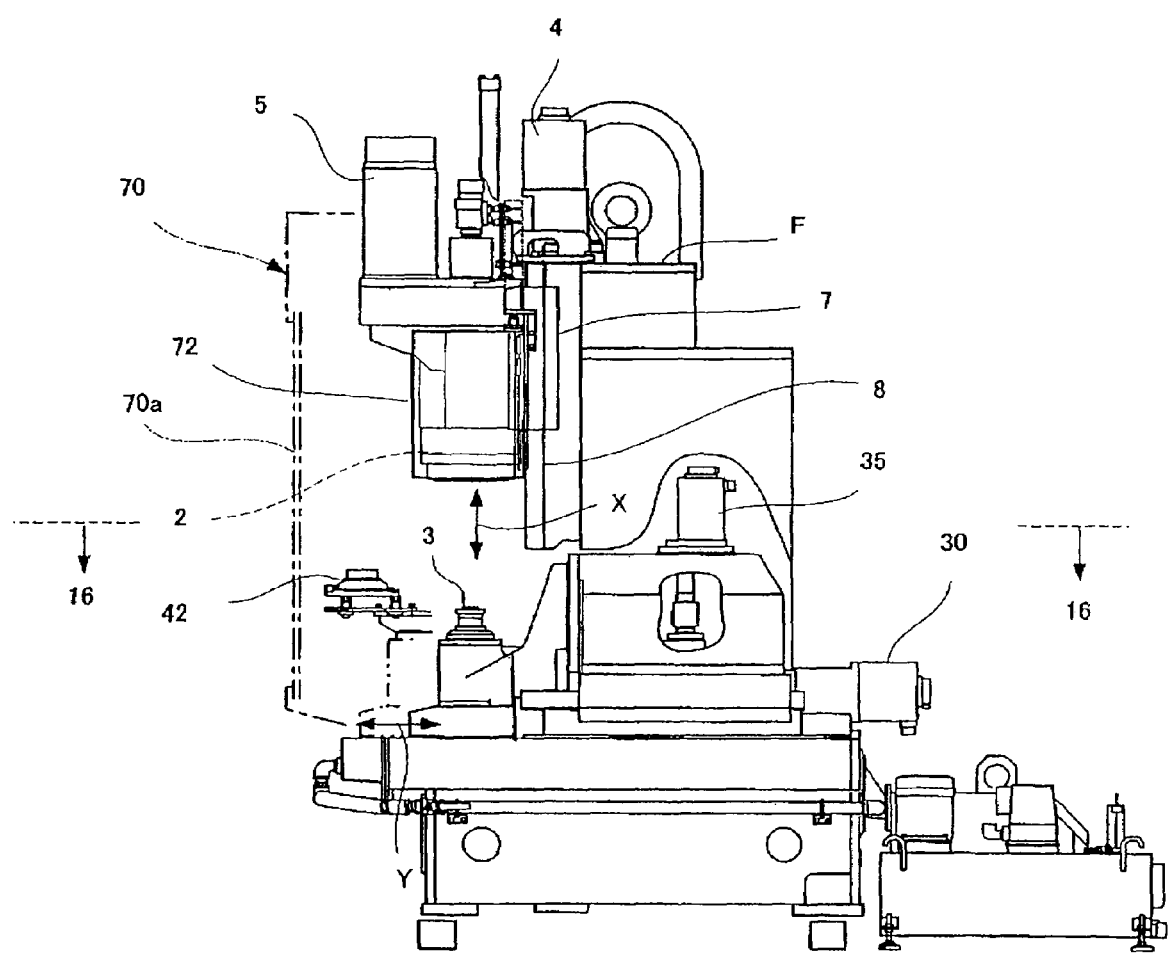
FIG. 15 is a side elevation view of the internal gear shaving machine shown in FIG. 14.
Figure 19:
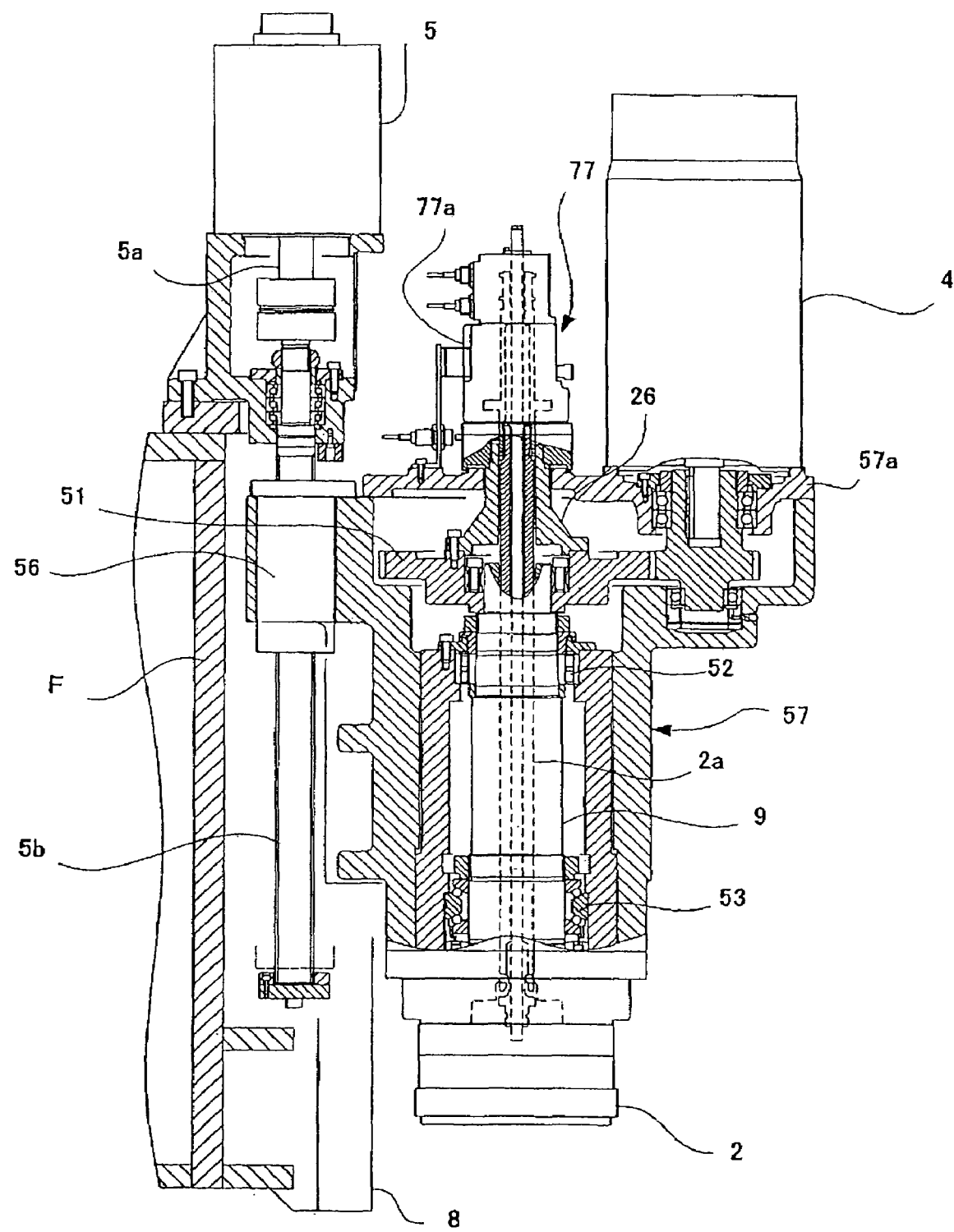
FIG. 19 is a cross-sectional view taken along line 19-19 of FIG. 14.

As shown in FIG. 19, the lifting and lowering actuator 5 is disposed so that its axis of rotation is oriented in the vertical direction, and is fixed to a structural frame F. A screw shaft 5b is connected to the rotation shaft 5a of the lifting and lowering actuator 5, and extends in the vertical direction. A nut body 56 is screwed on the screw shaft 5b. The nut body 56 is connected with a support 57. The support 57 is slidably attached on a perpendicular rail 8 (refer to FIG. 14) provided on the structural frame F. Moreover, to maintain the balance of support 57 on the left and right side, as shown in FIG. 14, the left and right ends of the support 57 are connected with piston rods of balance cylinders F1, F2, respectively, supported by the structural frame F.

Figure 20:
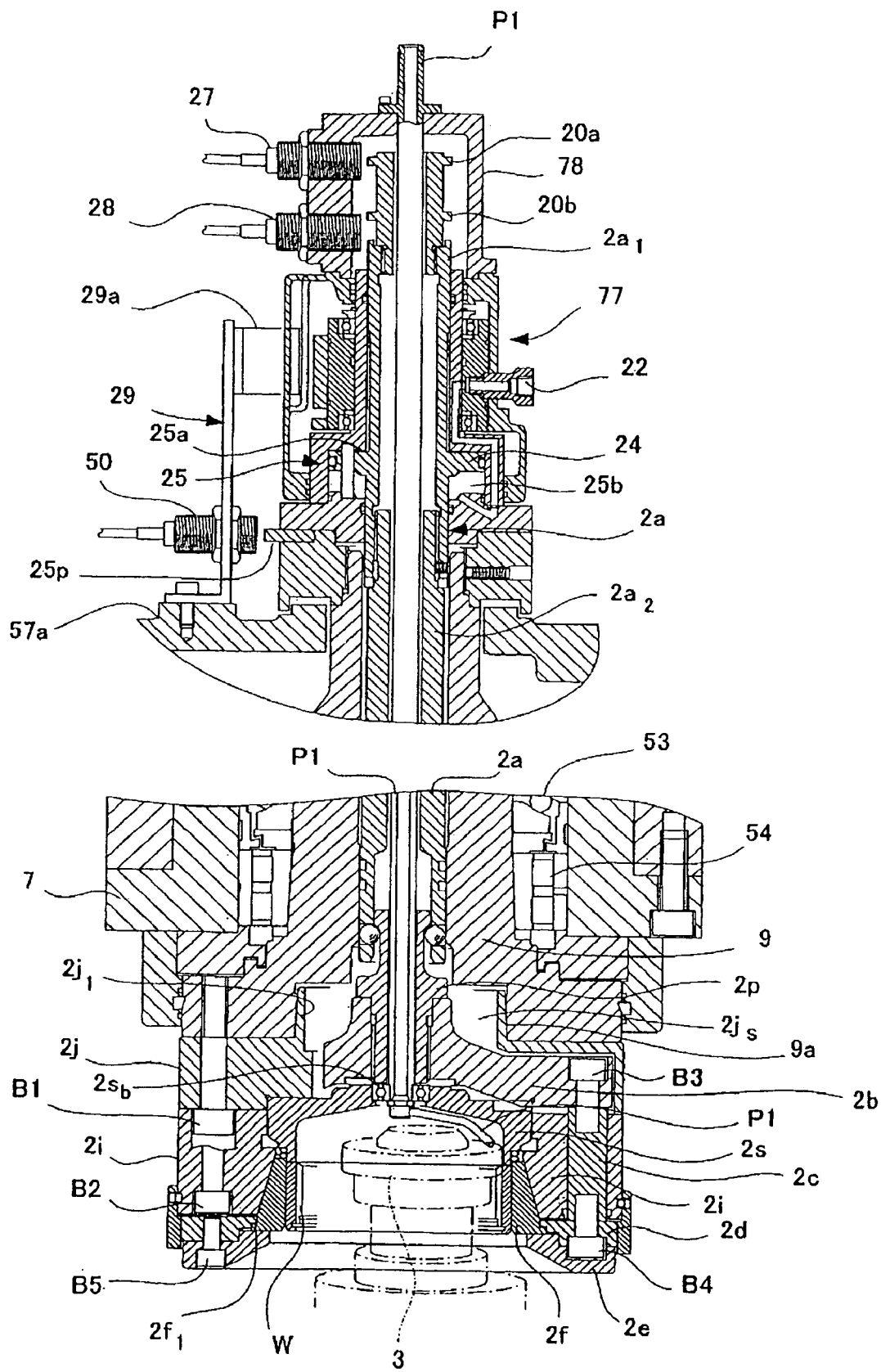
FIG. 20 is an enlarged longitudinal sectional view of FIG. 19 with protions omitted.

A spindle motor 4 and a main shaft 9 are supported by the support 57. The axis of the spindle motor 4 and main shaft 9 are each oriented in the vertical direction, and are drivingly connected by a gear 51. The main shaft 9 is rotatably supported about the upper and lower shafts by bearings 52, 53, 54 within the support 57 (FIGS. 19, 20). A workpiece chuck 2 is supported by the main shaft 9 as shown in FIG. 19.

When the lifting and lowering actuator 5 is driven, the support 57 ascends and descends along the screw shaft 5b, whereby the workpiece chuck 2 ascends and descends with the main shaft 9. When the spindle motor 4 is driven, the main shaft 9 rotates, which rotates the workpiece chuck 2.

The workpiece chuck 2 has, as can be seen from its enlarged cross section shown in FIG. 20, a collet 2f which holds the outer circumferential surface of the internal gear with the axis of rotation of the internal gear, i.e., the workpiece W, oriented in the vertical direction, and a workpiece stopper 2s comprising a bearing surface which receives the upper end face in the axial direction of the workpiece W with the axis of rotation of the workpiece W oriented in the vertical direction.

A seat plate block 2j is fixed by a bolt B1 at the lower end of the main shaft 9. The seat plate block 2j has a cylindrical portion $2j_1$ which is inserted into a lower end recess 9a of the main shaft 9.

A drive shaft 2a which drives the collet 2f is disposed in a manner of passing through the inside of the main shaft 9 in the axial direction of the main shaft 9. A pull stud 2p is attached at the lower end of the drive shaft 2a in a manner of being freely removable by pulling.

The pull stud 2p is inserted into the cylindrical portion $2j_1$ of the seat plate block 2j. A radially extending arm 2b is screwed into the pull stud 2p, and the arm 2b is accommodated within an open space 2js of the seat plate block 2j. It should be noted that in FIG. 7, only an arm extending in one direction is shown for the sake of illustration, but the arms extend in three directions at equal angle intervals in the Example.

A guide member 2*i* having a tapering inner circumferential surface is fixed on the seat plate block 2*j* with a bolt B2. The workpiece stopper 2*s* is located between the seat plate block 2*j* and guide member 2*i*.

A connecting rod 2*c* is fixed on the arm 2*b* with a bolt B3. The connecting rod 2*c* passes through the guide member 2*i*. A collet pinching ring 2*d* is connected to the guide member 2*i* with a bolt B4. A collet pinching ring 2*e* is fixed on the collet pinching ring 2*d* with a bolt B5. A brim $2f_1$ of the collet 2*f* is nipped between these pinching rings 2*d*, 2*e*.

The collet 2*f* has a tapering outer surface guided by a slit (not shown) and the tapering inner circumferential surface of the guide member 2*i*. Therefore, when the drive shaft 2*a* is pulled upward in the Figure, the tapering outer circumferential surface of the collet 2*f* is guided by the tapering inner circumferential surface of the guide member 2*i*. The diameter of the collet 2*f* decreases in the radial direction due to elastic deformation, and nips the outer circumferential surface of the internal gear i.e., the workpiece W by clamping.

Figure 21:
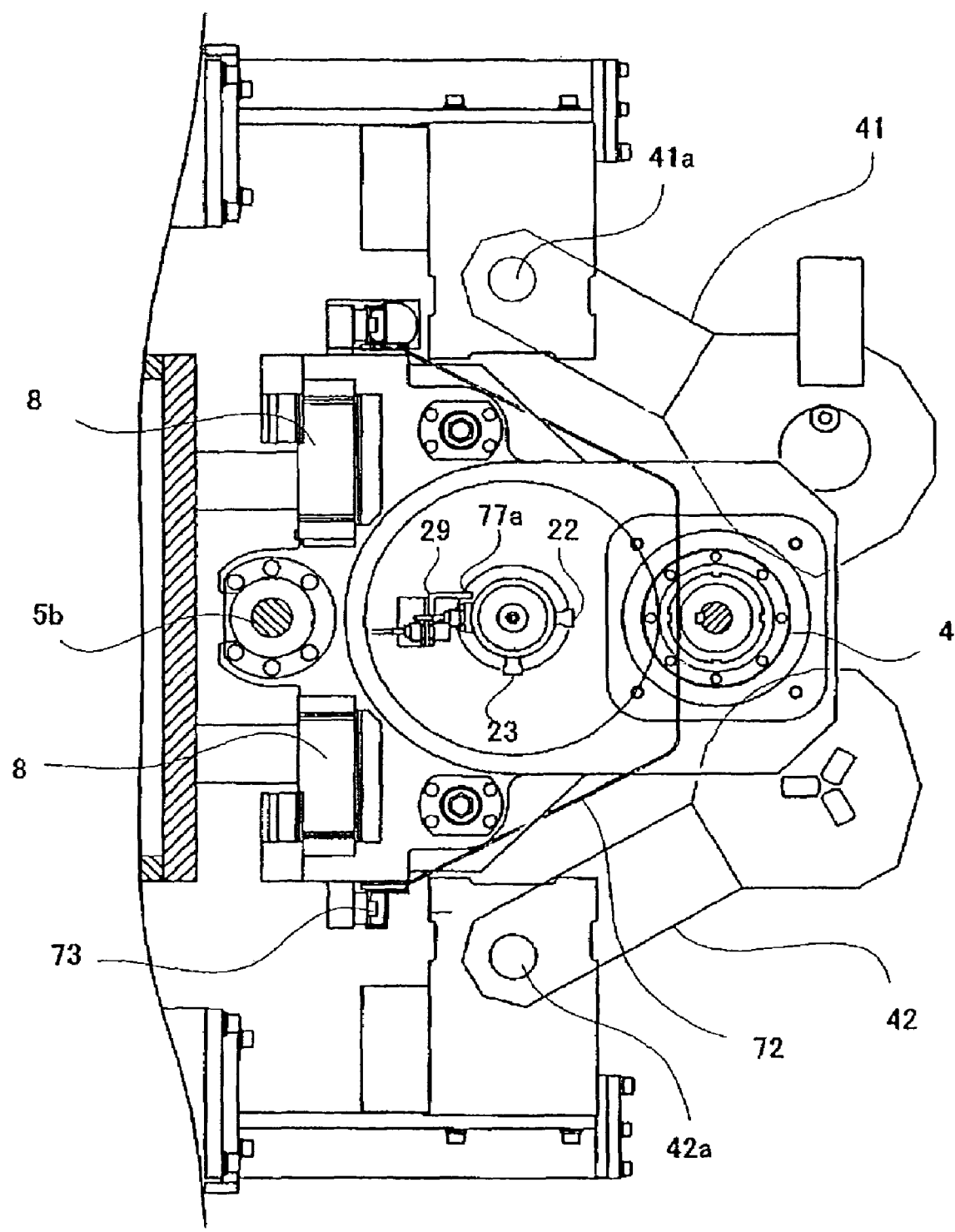
FIG. 21 is an enlarged plan view of a portion of the internal gear shaving machine of FIG. 16.
Figure 22:
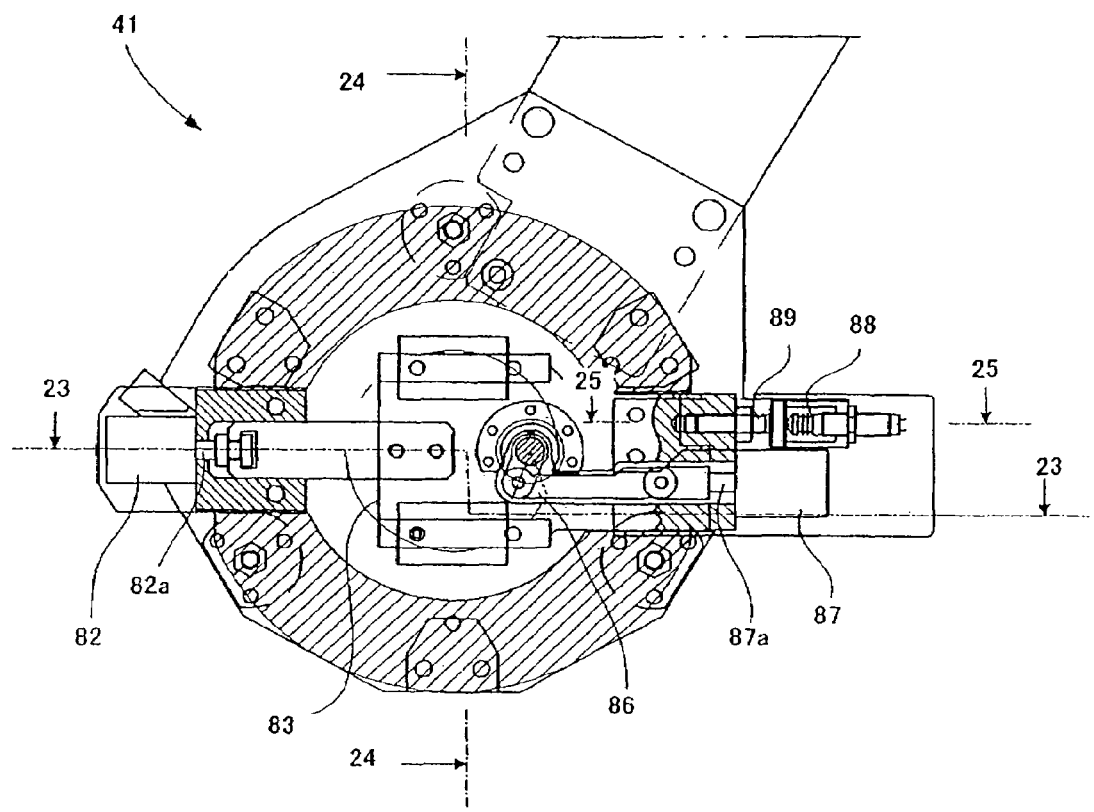
FIG. 22 is an enlarged horizontal sectional view which shows the workpiece loading arm shown in FIG. 16, and is a cross-sectional view taken along line 22-22 of FIG. 23.
Figure 23:
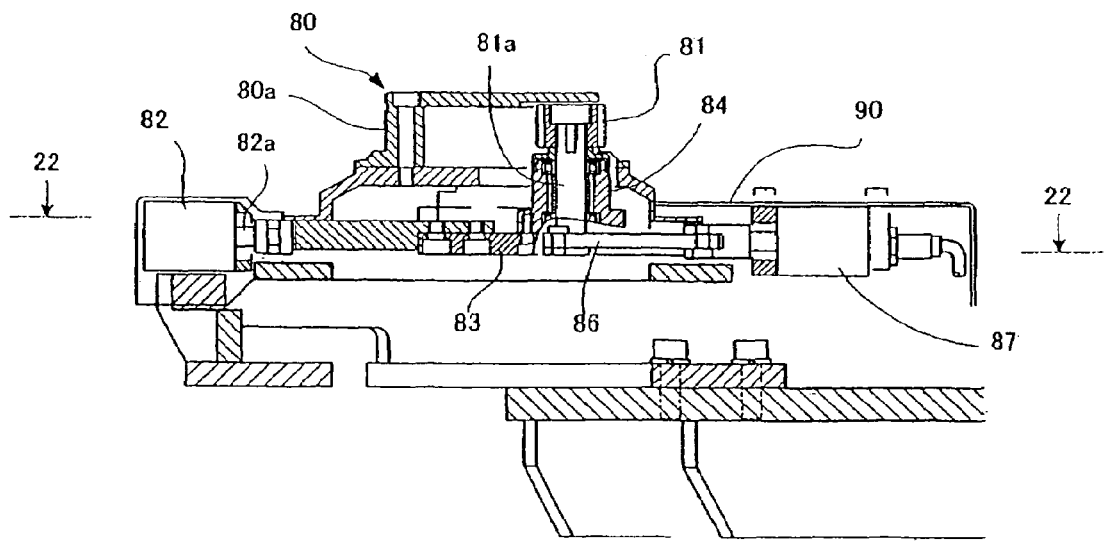
FIG. 23 is a cross-sectional view taken along line 23-23 of FIG. 22.
Figure 24:
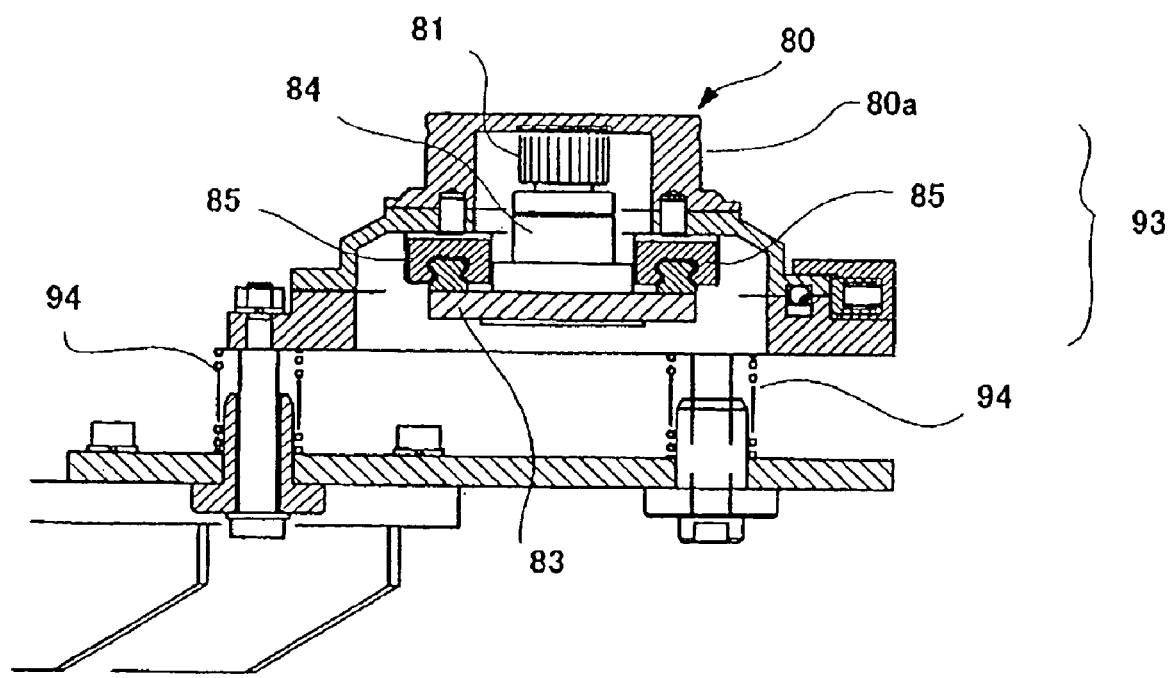
FIG. 24 is a cross-sectional view taken along line 24-24 of FIG. 22.
Figure 25:
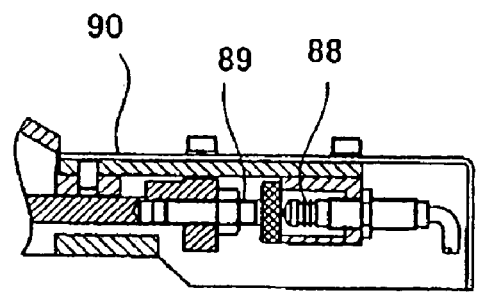
FIG. 25 is a cross-sectional view taken along line 25-25 of FIG. 22.
Figure 26:
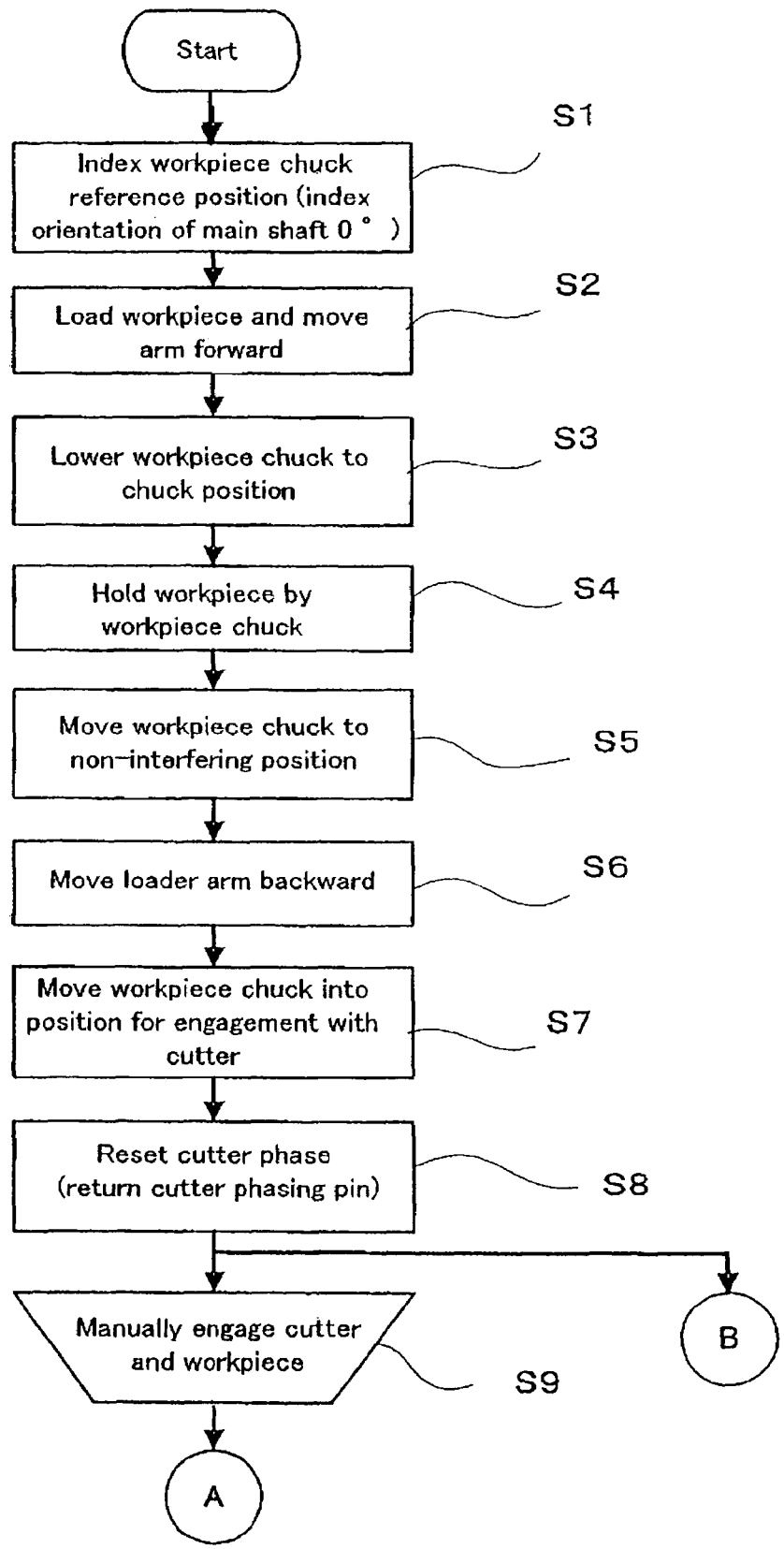
FIG. 26 is a flowchart showing part of the initial setting procedure of the internal gear shaving machine shown in FIG. 14.
Figure 27:
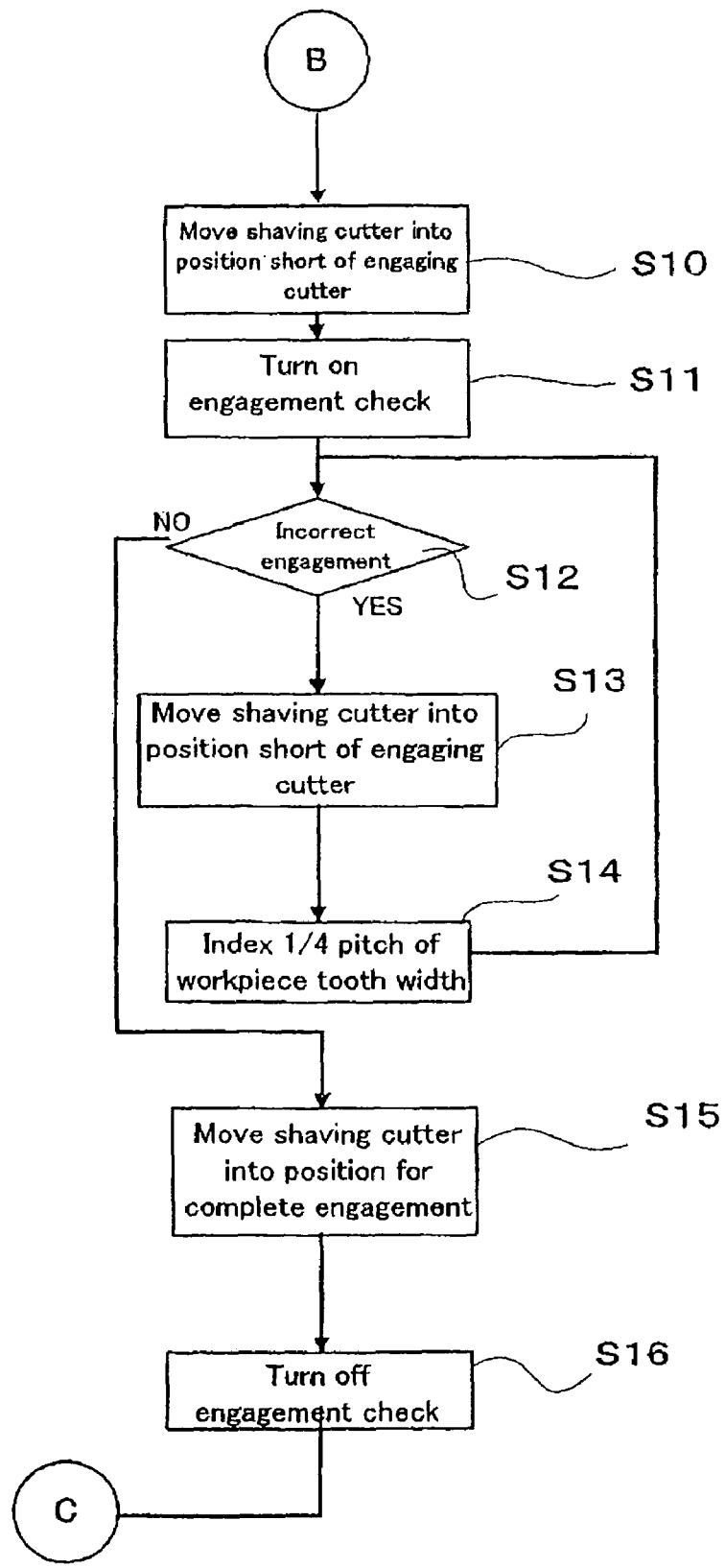
FIG. 27 is a flowchart which follows that of FIG. 26.
Figure 28:
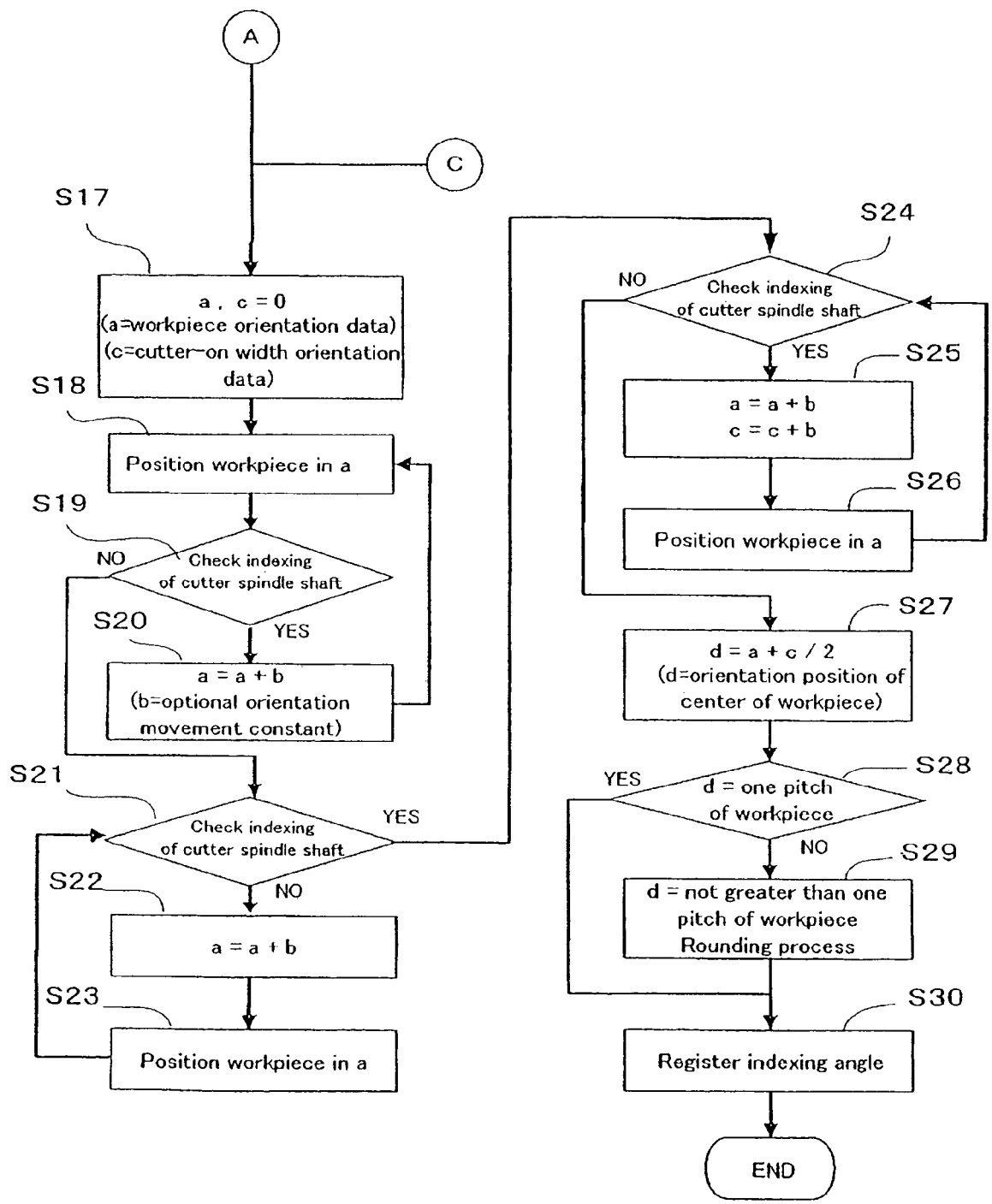
FIG. 28 is a flowchart which follows that of FIG. 27.

A rotary joint 77 is attached to an upper end portion of the drive shaft 2*a*. The rotary joint 77 comprises hydraulic oil ports 22, 23 (FIG. 21). A piston 24 is fixed on the drive shaft 2*a*. The piston 24 is in accommodated in a piston chamber 25. The piston chamber 25 is, as shown in FIG. 19, threadedly coupled to a gear holder 26 fixed on the main shaft 9 via the gear 51. Therefore, the piston chamber 25 does not move upwardly or downwardly with respect to the support 57, and rotates with the main shaft 9.

As shown in FIG. 20, hydraulic oil chambers 25*a*, 25*b* vertically partitioned by the piston 24 is formed inside the piston chamber 25. The hydraulic oil ports 22, 23 are in communication with the hydraulic oil chambers 25*a*, 25*b*, respectively. It should be noted that in the example shown, an upper part shaft portion $2a_1$ of the drive shaft 2*a* where the piston 24 is formed is threadedly coupled to a lower shaft portion $2a_2$.

When a hydraulic oil is fed to the hydraulic oil chamber 25*b* in a lower portion of FIG. 20 and the hydraulic oil is discharged from the hydraulic oil chamber 25*a* in an upper portion, the piston 24 is pushed upwardly in FIG. 6, whereby the drive shaft 2*a* is pulled up and the collet 2*f* clamps the workpiece W. In the reverse case, the collet 2*f* spreads and allows the workpiece W that it has been nipping to be removed.

The position of the drive shaft 2*a* in its upward and downward movement is detected by sensors 27, 28. The sensors 27, 28 employed may be proximity switches. The sensors 27, 28 are fixed on a cap body 78 crowned on an upper part of the rotary joint 77. In an upper end portion $2a_1$ of the drive shaft 2*a*, a pair of upper and lower annular projections 20*a*, 20*b* are formed. When the workpiece chuck 2 is in the chuck position, the sensor 27 detects a projection 20*a*. When the workpiece chuck 2 is not in the chuck position, the sensor 28 detects a projection 20*b*.

On a casing which forms the piston chamber 25, a projection 25*p* is formed on its side. This projection 25*p* is detected by a sensor 50. The sensor 50 is fixed on a plate 29 provided in a standing condition on a cover casing 57*a* of the support 57. The plate 29 comprises a lug 29*a* which slidably engages a vertical groove 77*a* (refer to FIG. 21) formed on the rotary joint 77. Therefore, the rotary joint 77 is prevented from rotating about the vertical axis by the lug 29*a*, but is allowed to move in the vertical direction. The sensor 50 detects the original position (reference rotation angle position) relating to the rotation angle of the main shaft 9 by the projection 25*p*. As described later, for phasing of the internal gear, i.e., the workpiece w and the teeth of the shaving cutter 3, the original position of the main shaft needs to be detected.

A coolant tube P1 passes through the drive shaft 2*a* and pull stud 2*p* in the axial direction. The upper end portion of the coolant tube P1 is fixed on the cap body 78, and its lower end portion is supported on a radial bearing 2*sb* supported on the workpiece stopper 2*s*. The tip of the coolant tube P1 protruding from the radial bearing 2*sb* into the workpiece chuck 2 extends sideways within the workpiece chuck 2, and a coolant discharge opening is oriented to the engagement point of the internal gear W held by the workpiece chuck 2 and the shaving cutter 3. In this manner, while the main shaft 9 is in rotation to carry out the shaving process, the coolant tube P1 does no rotate and a coolant is provide for the engagement point of the internal gear W and shaving cutter 3 always from above of the internal gear W.

Figure 16:
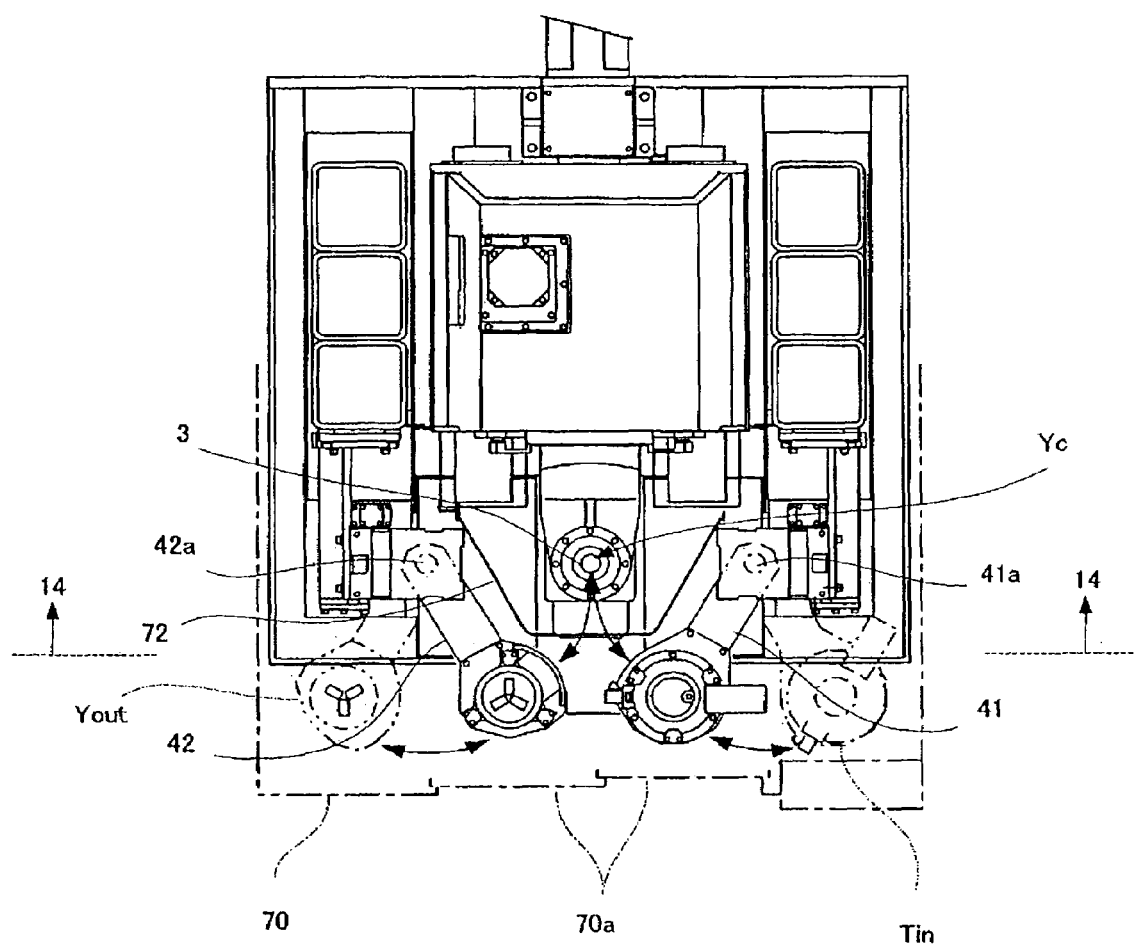
FIG. 16 is a cross-sectional view taken along line 16-16 of FIG. 15.
Figure 17:
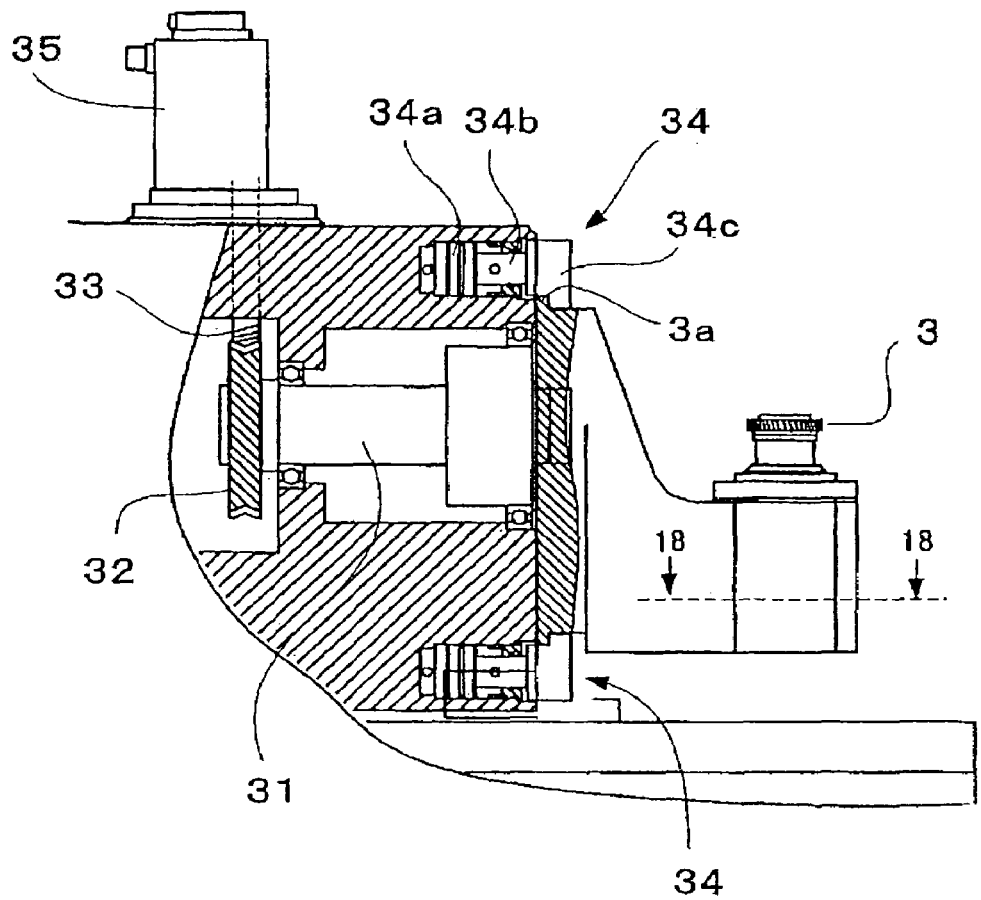
FIG. 17 is a longitudinal partly sectional view showing the inner structure of the shaving cutter which is a component of the internal gear shaving machine shown in FIG. 15.

The internal gear shaving machine 1 has, as shown in FIGS. 16 and 21, the workpiece loading arm 41 and workpiece unloading arm 42.

The workpiece loading arm 41 and workpiece unloading arm 42 are swinged by hydraulic cylinders 41*m*, 42*m* (refer to FIG. 14) and a pinion rack (not shown) which converts the linear motions of these hydraulic cylinders 41*m*, 42*m* into rotary motions, respectively.

The workpiece loading arm 41 has a phasing mechanism for phasing the internal gear loaded in the workpiece change position Yc on the workpiece loading arm 41.

The phasing mechanism has, as shown in FIGS. 22 to 25, an inner diameter guide member 80 which guides the inner periphery of the internal gear, a phasing pinion 81 guided by the inner diameter guide member 80 and engaging the internal gear, a moving mechanism for moving the phasing pinion 81 between a retracted position remote from the internal gear and a engaging position in which it is engaged with the internal gear, and a rotating mechanism which rotates the phasing pinion 81 engaged with the internal gear to a preliminarily determined phase.

The inner diameter guide member 80 is in the form of a cap to position the internal gear in the radial direction, and has an annular peripheral wall 80*a* which is in a shape that fits the inner periphery of the internal gear. This peripheral wall 80*a* has a clearance formed therein, through which the phasing pinion 81 goes in and out.

The moving mechanism comprises a first linear actuator driven by an air cylinder 82. A bearing 84 which rotatably supports a rotation shaft 81*a* of the phasing pinion 81 is mounted on a slider plate 83 connected to a rod 82*a* of the air cylinder 82. The slider plate 83 is freely slidably hung from the rail 85. When the rod 82*a* of the air cylinder 82 reciprocates, the phasing pinion 81 goes in and out through a gap of the peripheral wall 80*a* of the inner diameter guide member 80.

The rotation shaft 81*a* of the phasing pinion 81 is connected with an air cylinder 87 constituting a second linear actuator via a linkage 86. This linkage 86 constitutes a conversion mechanism which converts the linear reciprocating motion of a cylinder rod 87*a* which is a moving part of the second linear actuator into the rotary motion of the phasing pinion 81.

The phasing pinion 81 is rotated to a predetermined phase through the conversion mechanism by controlling the stroke of slide of the air cylinder 82 to be constant. The rotating mechanism is thus constituted.

In order to control the stroke of slide of the air cylinder 82 to be constant, a sensor 88 which detects that the slider plate 83 is in a predetermined position can be provided. In this embodiment, a bolt 89 fixed at the front end of the slider plate 83 is detected by a touch sensor 88 fixed on a cover casing 90. As this time, the touch sensor 88 can detect that the phasing pinion 81 is in such a position that it engages with the internal gear. When the tip of the bolt 89 comes into contact with the touch sensor 88, an air cylinder 82 is stopped by an air pressure control circuit, which is not shown in the Figure.

It should be noted that in this embodiment, the air cylinder 87 is fixed on the cover casing 90. When the air cylinder 82 constituting the moving mechanism operates to push out the phasing pinion 81, the air cylinder 87 constituting the rotating mechanism is not in operation yet. Therefore, when the air cylinder 82 operates, the phasing pinion 81 is rotated and pushed out simultaneously by the linkage 86. Such an operation allows the phasing pinion 81 to be engaged with the internal gear more easily. Upon or after the engagement of the phasing pinion 81 with the internal gear, the air cylinder 87 constituting the rotating mechanism operates and rotates the internal gear to a predetermined phase. It should be noted that the air cylinder 87 can be also supported on the slider plate 83.

An assembly 93 comprising the inner diameter guide member 80, rail 85, slider plate 83, air cylinder 82, cover casing 90 and others is elastically supported by a coil spring 94. This allows the impact of receiving the internal gear to be buffered.

In the internal gear shaving machine 1 having the above constitution, the initial setting of a control program is conducted according to the procedure described below prior to the shaving process. This enables the shaving cutter to be automatically engaged with the internal gear phased on the workpiece carrying member by the phasing mechanism. The initial setting method of the control program will be described with reference to the flowcharts of FIGS. 26 to 28.

First, a workpiece loading operation is carried out (steps S1 to S8) In step S1, a reference rotation angle position (original position) of the workpiece chuck 2 is calculated. The reference rotation angle position of the workpiece chuck 2 is a position in which the sensor 50 detects the projection 25p. Subsequently, a workpiece loading arm 41 with an internal gear whose phase is determined loaded thereon is moved forward from the workpiece loading position Yin to the workpiece change position Yc (step S2). The lifting and lowering actuator 5 is driven to move the workpiece chuck 2 and the internal gear on the workpiece loading arm 41 toward each other (step S3). The internal gear is held by the workpiece chuck 2 (step S4). The lifting and lowering actuator 5 is then again driven to raise the workpiece chuck 2 to such a height that it does not interfere with the workpiece loading arm 41 (step S5). Thereafter, the workpiece loading arm 41 is moved backward (step S6). The lifting and lowering actuator 5 is driven again to lower the workpiece chuck 2 to such a height position that it can engage the shaving cutter 3 (step S7). The phasing pin 3p (FIG. 18) of the shaving cutter 3 is reset so that the shaving cutter 3 can freely rotate (step S8).

Subsequently, the engagement of the workpiece is manipulated (S9, or S10 to S15). A manual case (step S9) or an automatic case (steps S10 to S15) can be selected for the manipulation of the engagement of the workpiece.

In the manual case (step S9), the shaving cutter 3 is manually moved in the horizontal direction by operating a handle, which is not shown in the Figure to cause the shaving cutter 3 to engage the workpiece. As this time, since the phasing pin 3p is reset and made free, the shaving cutter 3 can be manually rotated so that it engages the workpiece.

In the automatic case (steps S10 to S15), the driving member 30 is driven and the shaving cutter 3 is horizontally moved (Y direction in FIG. 15) to such a position just short of engaging the workpiece. The driving member 30 is driven so that the shaving cutter 3 is further moved horizontally toward the engaging position, and an engagement check program is started (step S11). When an abnormal current flowing to a motor constituting the driving member 30 is detected, it is judged that an incorrect engagement is found, and when no abnormal current flows it is judged that there is no incorrect engagement (step S12). An incorrect engagement can be caused by the contact between the tip of the teeth of the shaving cutter 3 and those of the teeth of the internal gear, i.e., the workpiece. In case of the judgement of incorrect engagement, the shaving cutter 3 is slightly moved backward (step S13), the workpiece is rotated by a ¼ pitch of the tooth width (interval between top lands of teeth) only (step S14), and engagement is judged again (step S12). If it is judged that there is no incorrect engagement, the shaving cutter 3 is horizontally moved to such a position that it is completely engaged (step S15) and the engagement check program is turned off (step S16).

Subsequently, the spindle motor 4 which rotationally drives the workpiece chuck 2 is rotated by a predetermined rotation angle to calculated a phase difference between the predetermined rotation angle position of the shaving cutter 3 whose phase is adjusted by the phasing pin of the shaving cutter 3 and the reference rotation angle position of the workpiece chuck (steps S17 to S30).

In the shaving cutter 3, as shown in FIG. 18, when the phase of a spindle shaft 3s is adjusted by the phasing pin 3p, a projection 3g formed on the side opposite to a latching recess 3c into which the phasing pin 3p is latched is detected by a proximity sensor 3f. This proximity sensor 3f comprises a sensing width H which senses the projection 3g as shown in FIG. 18, and this width H is hereinafter referred to as "cutter on width". The phase of the workpiece is the same as that of the workpiece chuck 2, and therefore is the same as that of the spindle motor 4. The phase of the workpiece is hereinafter referred to as a "workpiece orientation data" and represented by the symbol a. The information relating to the phase of the shaving cutter when it is on the cutter on width is hereinafter referred to as "cutter on width orientation data" and represented by the symbol c.

First, at the stage where the engagement check is OFF (step 16), the workpiece orientation data and the cutter on width are set to "0" (step 17). At the stage where the engagement check is OFF (step S16) the phase of the shaving cutter 3 is unknown.

The workpiece is positioned so that the workpiece orientation data, a=0 (step S18) to detect whether the shaving cutter 3 lies within the cutter on width or not at this stage (step 19). When it is judged that the shaving cutter 3 lies within the cutter on width, that is, when the proximity sensor is on, The workpiece is rotated by a constant rotation angle (b) until the proximity sensor becomes off (step S20). This constant rotation angle corresponds to, for example, one pulse of a pulse motor, i.e., the spindle motor 4. This rotation operation is repeated. When the proximity sensor 3f is judged to be off (step 19), indexing of the shaving cutter 3 is carried out (step 21).

In this case, as in step 20, the shaving cutter 3 is rotated by a predetermined rotation angle b (step S22, step 23). This rotation operation is repeated. Subsequently, when it is judged that the proximity sensor 3f is on, that is, when it is judged that the cutter shaft indexing is "yes" (step 21), move on to the next step. At this point, one end of the sensing width H of the proximity sensor 3f is detected.

Similar rotation operation is further repeated (steps S24 to S26), When it is judged that the proximity sensor 3f is off, that is, when it is judged that the cutter shaft indexing is "NO", The other end of the sensing width H of the proximity sensor 3f is detected in this position.

When the data relating to the rotation angle position of the spindle shaft corresponding to the sensing width H of the proximity sensor 3f is obtained in this manner, the middle angle position of the sensing width H is calculated (step S27). If the information relating to this middle angle position is obtained, the internal gear held by the workpiece chuck 2 can be automatically engaged with the shaving cutter 3 whose phase is determined by the phasing pin 3p by rotating the spindle motor 4 from the reference rotation angle position to this middle angle position.

The rotation angle of the spindle motor 4 from the reference rotation angle position to the middle angle position is normally considered to be greater than one pitch of the internal gear. Therefore, to minimize the angle of the phasing of the spindle motor 4, the angle is so calculated as to be less than the rotation angle corresponding to one pitch of the teeth of the internal gear (step S28, S29). For example, when the angular difference of the reference rotation angle position and the middle angle position of the spindle motor 4 is 21° and one pitch of the teeth is 5°, the minimum angle is 21°−5°×4=1°. The thus obtained minimum angle is stored in a storage device within a control apparatus (step S30).

Figure 29:
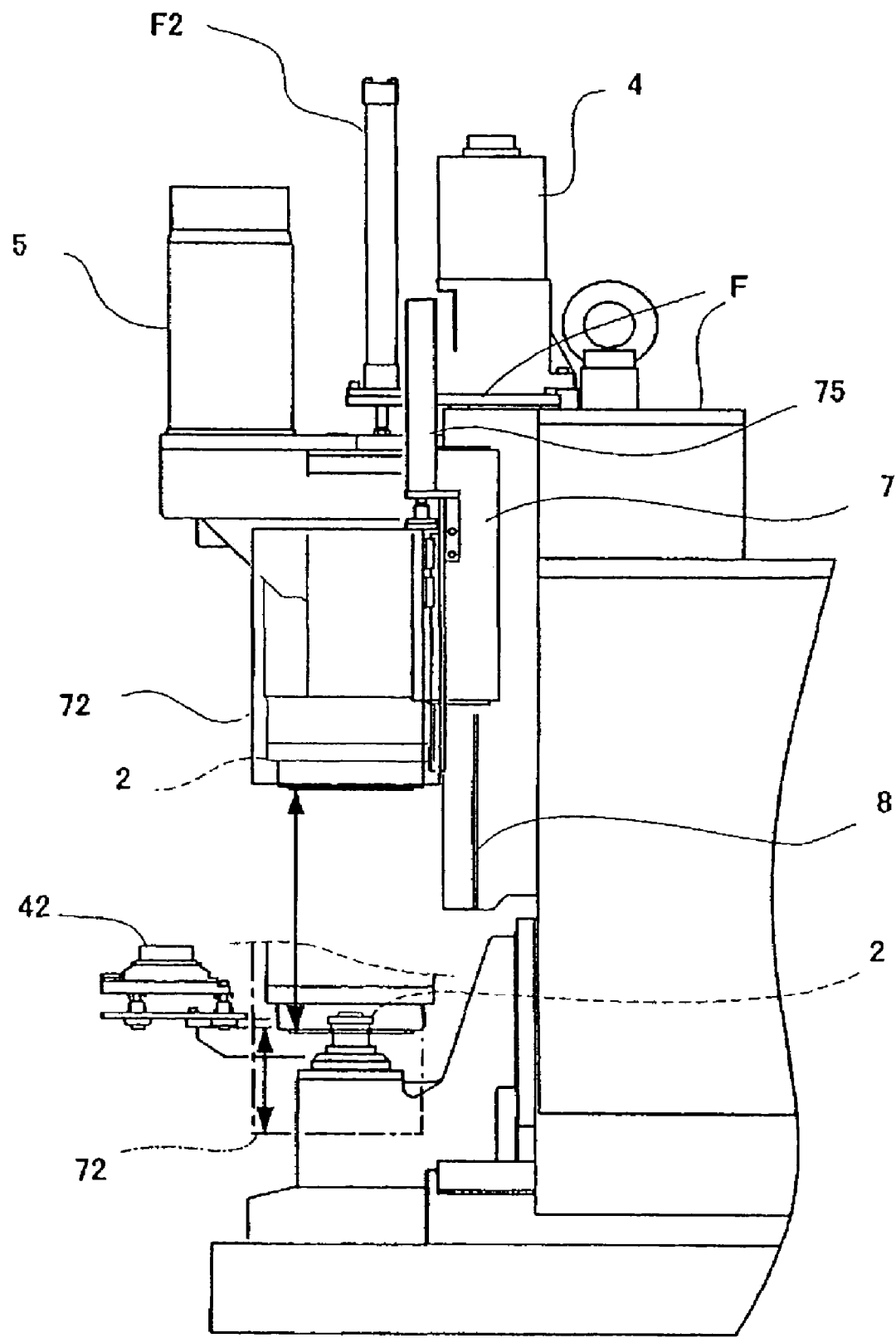
FIG. 29 is a side elevation view of FIG. 15 with parts enlarged.
Figure 30:
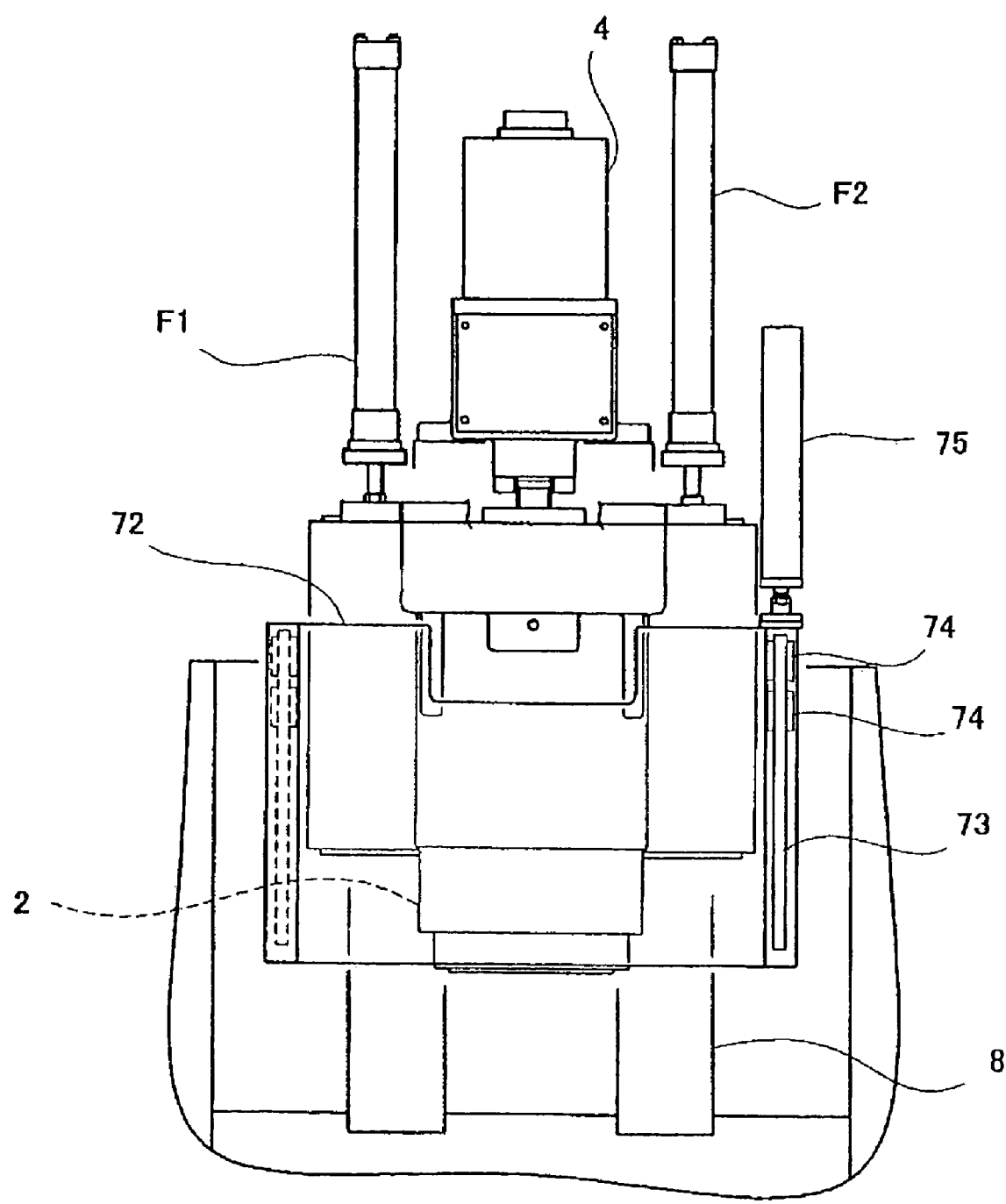
FIG. 30 is a partly enlarged front view of FIG. 14.
Figure 31:
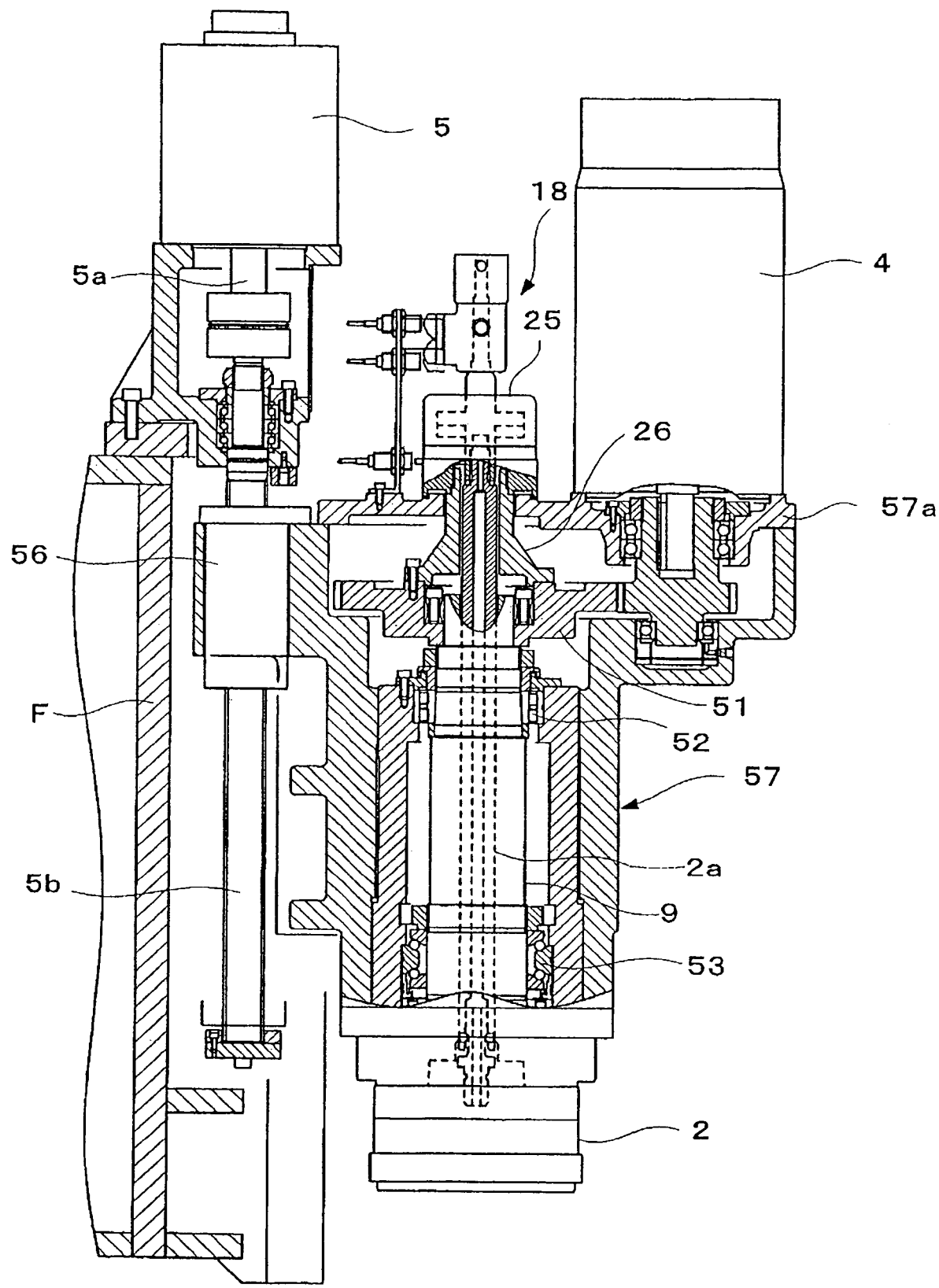
FIG. 31 is a longitudinal sectional view showing a fourth embodiment of an internal gear shaving machine according to the present invention.

As enlargedly shown in FIGS. 29 and 30, a coolant splash guard cover 72 is supported on the support 57. The coolant splash guard cover 72 is supported on the support 57 freely movably in the vertical direction. A slide rail extending in the vertical direction is fixed on the support 57. The coolant splash guard cover 72 comprises rollers 74 which run on the slide rail 73. A hydraulic cylinder 75 is fixed on the support 57, and the piston rod of the hydraulic cylinder 75 is connected to the coolant splash guard cover 72. Therefore, the coolant splash guard cover 72 moves upwardly and downwardly on the slide rail by the action of the hydraulic cylinder 75.

As shown in FIG. 29 with a chain line, the coolant splash guard cover 72 is supported in such a manner that the lower end of the cover is movable downwardly further than the lower end of the workpiece chuck 2.

Changing and processing of a workpiece are carried out in the following manner. First, when the workpiece is loaded in the workpiece loading position Yin, the workpiece loading arm 41 swings and loads the workpiece in the workpiece change position. The workpiece chuck 2 then descends and holds the workpiece on the workpiece loading arm 41. Thereafter, the workpiece chuck 2 ascends to such a position that does not interfere with the workpiece loading arm 41, and the workpiece loading arm 41 swings back into the workpiece loading position.

Subsequently, to conform the engaging phase of the workpiece and the shaving cutter 3, the spindle motor 4 rotates the workpiece chuck 2 by the minimum angle under the control of a control apparatus which is not shown in the Figure.

Subsequently, the workpiece chuck 2 descends to such a height position that the shaving cutter 3 goes inside the internal gear W. Simultaneously, the coolant splash guard cover 72 descends over the support 57. The lower end of the cover further moves downwardly from the lower end of the workpiece chuck 2, and covers the lower front face and side face of the workpiece chuck 2. The shaving cutter 3 swings about the horizontal shaft to form a desired crossed axes angle with the workpiece. After being fixed at a desired swinging angle, the shaving cutter 3 moves in the horizontal direction to approach the internal gear W, engaging the internal gear W.

The workpiece chuck 2 forcefully and rotationally drives the workpiece, whereby the shaving cutter 3 is rotated in response to the rotation of the workpiece, and a finishing process is carried out by combining the vertical movement of the workpiece chuck 2 and the horizontal movement of the shaving cutter 3. After the finishing process is completed, the workpiece chuck 2 and the coolant splash guard cover 72 ascend simultaneously. The workpiece unloading arm 42 then swings into the workpiece change position Yc positioned in the space between the workpiece chuck 2 and the shaving cutter 3 to be ready to receive the processed workpiece. The workpiece chuck 2 descends and the workpiece unloading arm 42 receives the processed workpiece from the workpiece chuck 2. After the workpiece chuck 2 ascends to such a position that it does not interfere with the workpiece unloading arm 42, the workpiece unloading arm 42 swings and unloads the processed workpiece from the workpiece change position Yc to the workpiece removing position Yout.

In the above third embodiment, In the internal gear while being processed, a coolant is provided from above intensively at the cutting point of the internal gear. Therefore, the coolant is stably provided, which contributes to improving the processing accuracy.

Moreover, splashing of the coolant can be accurately prevented and an improvement in the processing accuracy can be achieved by providing the coolant splash guard cover 72 which moves with the workpiece chuck in addition to the body cover. Moreover, the coolant splash guard cover 72 is movably supported on the support 57 which supports the workpiece chuck in the vertical direction. Therefore, the cover moves independently from the workpiece chuck 2 and ascends to the same level as the lower end position of the workpiece chuck 2 or a higher position to open a workpiece change space in the workpiece change position. The cover can further descend further than the lower end of the workpiece chuck in the workpiece process position to effectively prevent splashing of the coolant.

Moreover, as mentioned above, since the phase of the workpiece on the workpiece loading arm 41 is determined by the phasing mechanism, automatic engagement of the workpiece and the shaving cutter is enabled.

Subsequently, a fourth embodiment of the internal gear shaving machine according to the present invention will be described below with reference to FIGS. 31 to 34.

Figure 32:
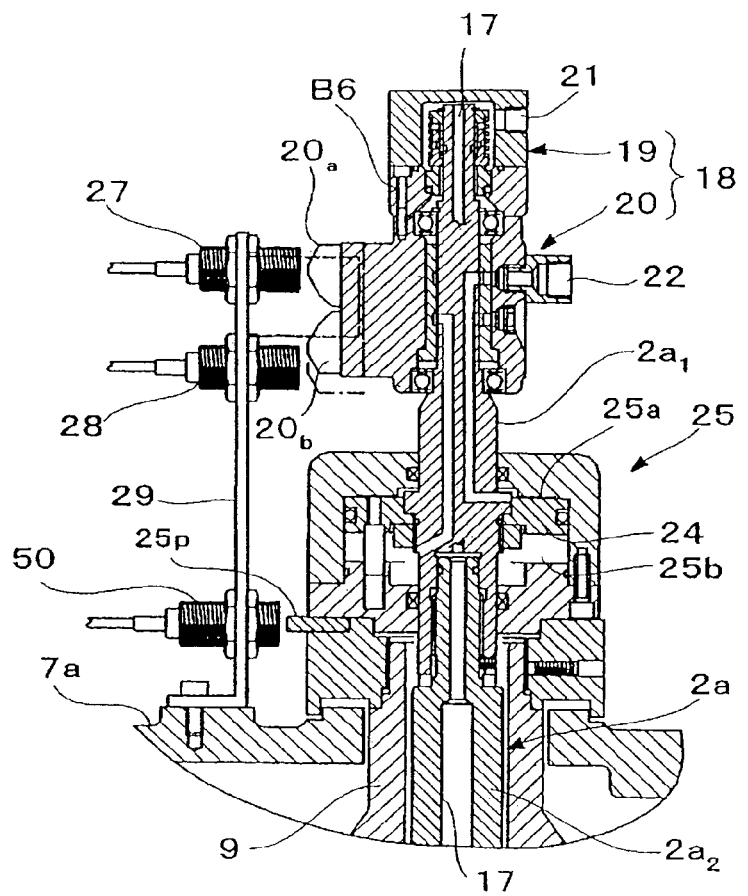
FIG. 32 is an enlarged longitudinal sectional view of portions of FIG. 31.
Figure 32:
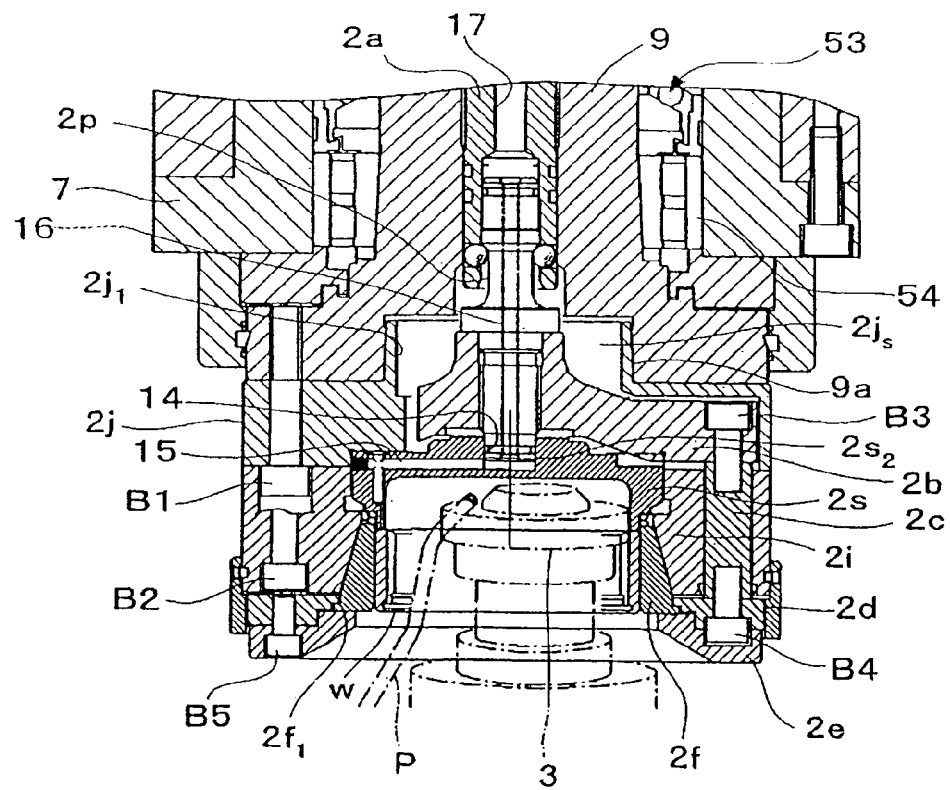

In an internal gear shaving machine of the fourth embodiment, with reference to FIG. 32, a pull stud 2p connected to the lower end of a drive shaft 2a is freely slidably inserted into a mating hole $2s_2$ formed on a workpiece stopper 2s, and airtightness is maintained by a seal ring 14.

Figure 33:
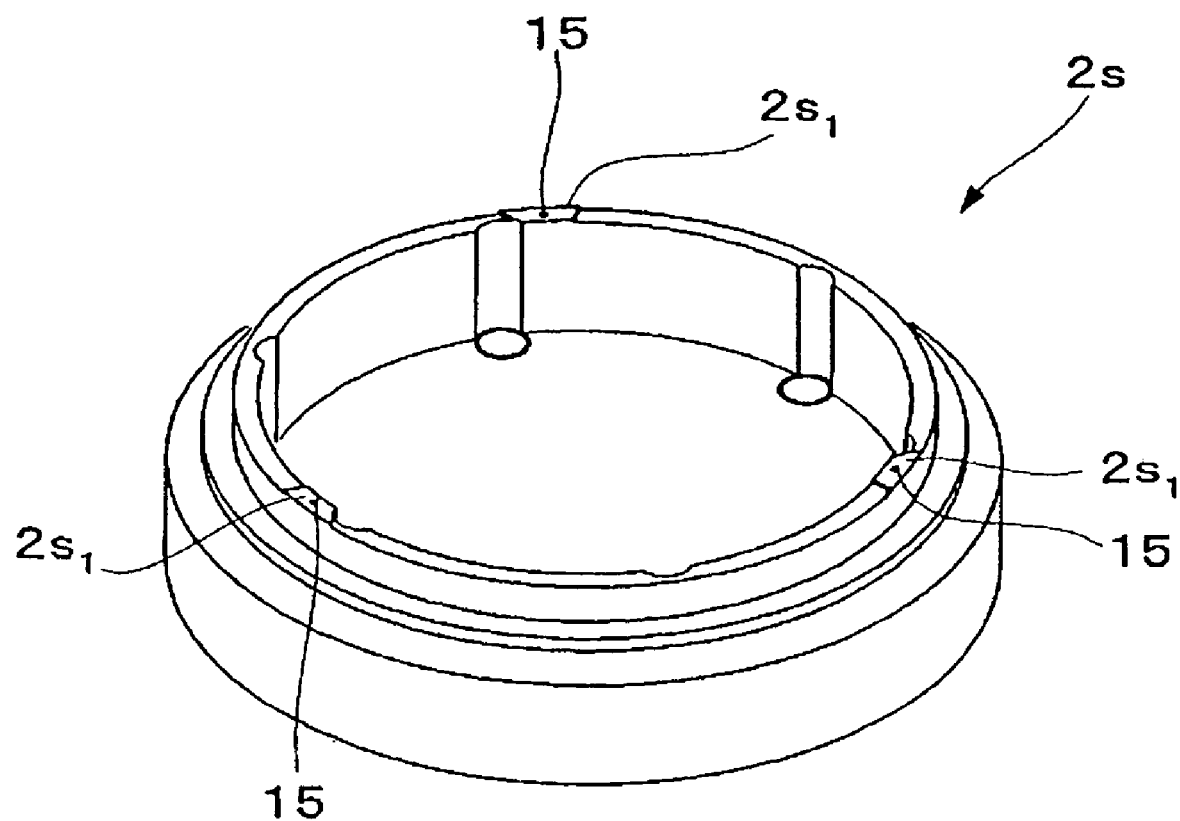
FIG. 33 is a component of the present invention, and is an enlarged perspective view of the workpiece stopper shown in FIG. 32.

A through hole 15 which is in communication with the mating hole $2s_2$ opens onto a bearing surface $2s_1$ of the workpiece stopper 2s (refer to FIG. 33). A through hole 16 which is in communication with the through hole 15 is formed inside the pull stud 2p in a manner of passing through the central axis position of the pull stud 2p. A through hole 17 which is in communication with the through hole 16 is formed on the drive shaft 2a in a manner of passing through the axis position of the drive shaft 2a.

Referring to FIG. 7, the opening onto the bearing surface $2s_1$ preferably has at least three openings at equal angle intervals. Thereby, if the work held by the workpiece chuck 2 inclines, an undermentioned air gap sensor can detect that.

A rotary joint 18 is attached to an upper end portion of the drive shaft 2a. In the rotary joint 18, an upper part joint 19 and lower part joint 20 are connected by a bolt B6.

The upper part joint 19 comprises a port 21 which is in communication with the through hole 17. An air gap sensor, which is not shown in the Figure, is connected to the port 21 via a flexible pipe (not shown). The air gap sensor used may be a known one. Generally, the air gap sensor includes a pressure sensor which transduces analog input signals into electronic signals, sends air at a predetermined pressure, and detects secondary pressure. The air force-fed to the port 21 is sent to an air passage constituted of the through holes 17, 16, 15 and reaches the opening of the bearing surface $2s_1$. If the internal gear, i.e., the workpiece W is in intimate contact with the bearing surface $2s_1$ of the workpiece stopper 2s, the air does not leak out from the through hole 15. Therefore, in such a case, since there is no decrease in the pressure, the pressure sensor can detect it so that it can detect the internal gear, i.e., the workpiece w is in intimate contact with the bearing surface $2s_1$ of the workpiece stopper 2s, that is, that it is seated.

It should be noted that the seating sensor is not limited to an air gap sensor, but also can be constituted by disposing an electrical probe, pressure-sensitive sensor, and other sensors on the bearing surface $2s_1$.

The lower part joint 20 comprises hydraulic oil ports 22, 23 (refer to FIG. 21). A piston 24 is fixed on the drive shaft 2a. The piston 24 is accommodated in a piston chamber 25. As shown in FIG. 5, the piston chamber 25 is threadedly coupled to a gear holder 26 fixed on a main shaft 9 via a gear 51. Therefore, the piston chamber 25 does not move upwardly or downwardly with respect to a support 57, and rotates with the main shaft 9.

The position of the drive shaft 2a in its upward and downward movement is detected by sensors 27, 28. The sensors 27, 28 employed may be proximity switches. The sensors 27, 28 are fixed on a plate 29 provided in a standing condition on a cover casing 57a of the support 57. The sensors 27, 28 detect a pair of upper and lower projections 20a, 20b formed on the outer circumferential surface of the lower part joint 20. The rotary joint 18 is prevented from rotating about the axis by a lug 29a, but is allowed to move in the vertical direction.

It should be noted that in FIG. 32, the numeral P represents a coolant supply pipe, which is supported on a shaft case of the shaving cutter 3, although not shown in the Figure.

Since the seating sensor detects that the internal gear is in a predetermined position, it contributes to the phasing accuracy of the internal gear and the shaving cutter 3.

Further, the air gap sensor can blow dust off the contact surface of workpiece with air blow.

Figure 34:
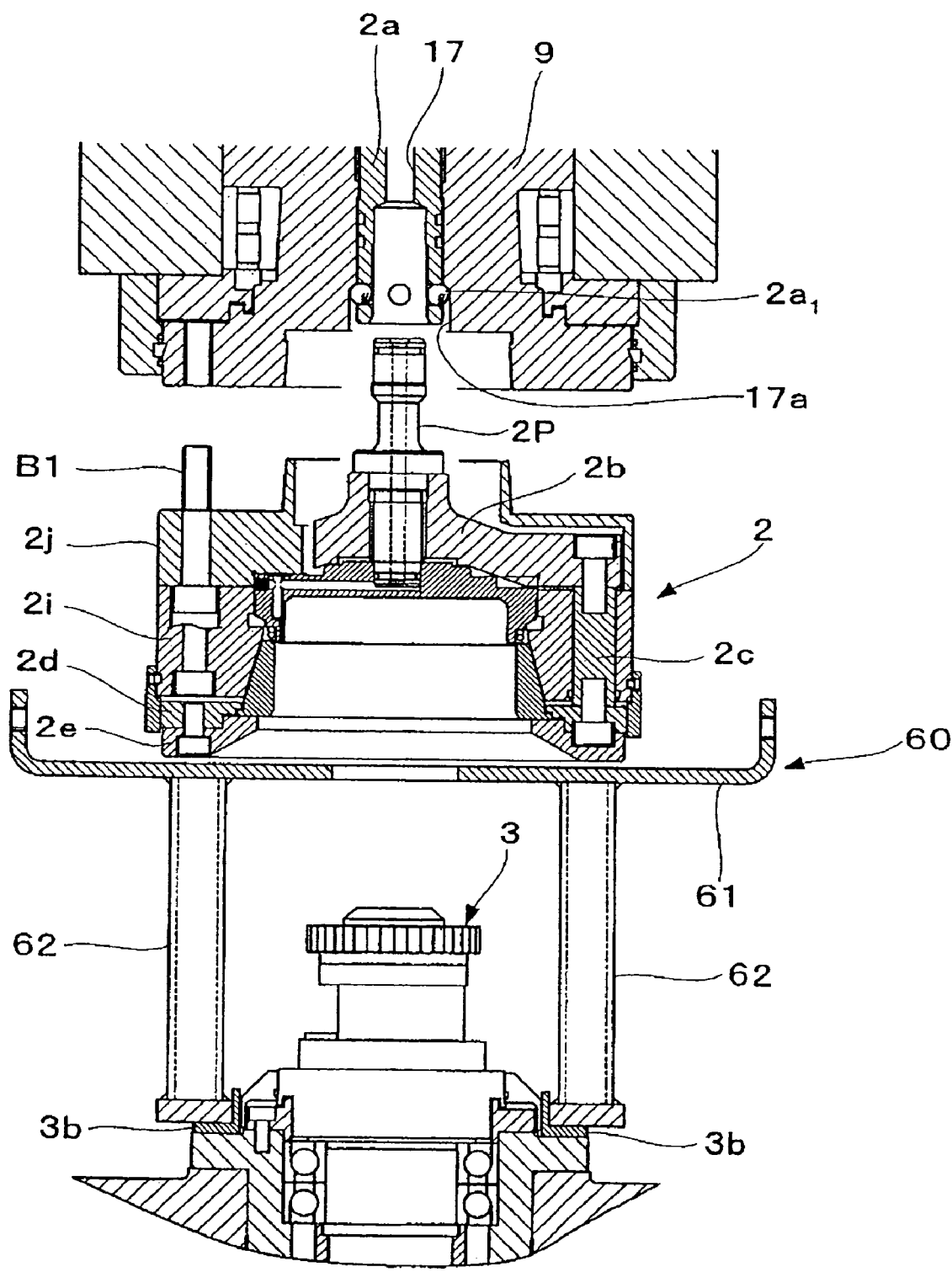
FIG. 34 is a cross-sectional view showing a separated state of the workpiece chuck which is a component of the present invention.

As shown in FIG. 34, the main body of the workpiece chuck 2 can be separated from the drive shaft 2a by pulling out the pull stud 2p from the drive shaft 2a. The main body of the workpiece chuck 2 is changed depending on the type of the internal gear, i.e., the workpiece (those having different diameters).

To facilitate changing of the body of the workpiece chuck 2, a temporary rest 60 which receives the body of the workpiece chuck 2 in an upper position of the shaving cutter 3 is preferably prepared.

The temporary rest 60 has a rest body 61 and four legs 62 provided in a standing condition on the rest body 61. As shown in FIG. 34, shoulders 3b for mounting the legs 62 are formed on the shaft case of the shaving cutter 3.

When the body of the workpiece chuck 2 is changed, the bolt B1 shown in FIG. 32 is removed and separated from the main shaft 9 in advance. A guide member 2j and collet pinching rings 2d, 2e each has a through-hole (not shown) formed thereon so that the bolt B1 can be removed without removing these components. The swinging angle of the shaving cutter 3 is set to 0 to maintain the receiving face of the rest body 61 of the temporary rest 60 horizontally.

In addition, the support 57 is lowered to maintain the axis of rotation of the body of the workpiece chuck 2 at an approximately same condition as the axis of the main shaft, and the lower end face of the body of the workpiece chuck 2 is moved towards the upper face of the temporary rest body 61.

Subsequently, the drive shaft 2a is pushed out until a ball $2a_1$ which latches the pull stud 2p is positioned in an enlarged diameter hole portion 17a as shown in FIG. 34, The pull stud 2p is pulled out from the body of the drive shaft 2a.

If the support 57 is elevated, the body of the workpiece chuck 2 is mounted on the temporary rest 60. The body of the workpiece chuck 2 can be moved onto the drive shaft 2a and main shaft 9 by detaching the temporary rest 60 on which the body of the workpiece chuck 2 is mounted from the shaving cutter 3, placing the temporary rest on which the body of another workpiece chuck is mounted on the shoulder 3b of the shaving cutter 3, and proceeding the steps described above in the reverse direction.

In the above embodiment, the workpiece chuck is moved upwardly and downwardly to change workpieces, but the workpiece carrying member may be constituted to be movable upwardly and downwardly. Moreover, the workpiece carrying member is not limited to the embodiments mentioned above, and other known means which can transfer workpieces can be employed.

In the embodiments described above, the shaving cutter is freely swingable, but the workpiece chuck may be freely swingably constituted. Moreover, instead of the workpiece, the shaving cutter may be forcefully driven, or the shaving cutter and workpiece can be both forcefully driven. Furthermore, in the embodiments described above, a collet chuck is shown as the workpiece chuck, but a drill chuck and other holding means can be also employed.

Moreover, in the embodiments described above, such constitutions that the workpiece chuck moves upwardly and downwardly to change workpieces are employed, but such a constitution that the workpiece loading arm and workpiece unloading arm are moved upwardly and downwardly may be employed.

The invention claimed is:

1. An internal gear shaving machine in which a shaving cutter is engaged with an internal gear held by a workpiece chuck at a crossed axes angle and tooth flanks of the internal gear are subjected to final machining while at least one of the shaving cutter and workpiece chuck is rotationally driven, at least one of the workpiece chuck and shaving cutter being supported movably toward and away from each other in a vertical orientation with the workpiece chuck higher than the shaving cutter and at least one of the workpiece chuck and shaving cutter supported movably in the horizontal direction relative to each other, and the workpiece chuck being so constructed that it holds the outer circumferential surface of the internal gear with the axis of rotation of the internal gear oriented in an up-down direction so that shavings produced during processing by the shaving cutter can fall downwardly from the internal gear, teeth of the shaving cutter and teeth of the internal gear being indexed to a predetermined phase for the machining, and wherein during a workpiece exchange, the workpiece chuck is movable at least vertically to effect the exchange.

2. An internal gear shaving machine according to claim 1, wherein the workpiece chuck is supported so as to be movable laterally to a lateral position and constituted to hold the axis of rotation of the internal gear in a vertical orientation, and further has a workpiece carrying member for changing the workpiece in the lateral position of the workpiece chuck, and the workpiece carrying member supports the internal gear with the gear's axis of rotation oriented vertically so that the workpiece chuck can hold the internal gear on the workpiece carrying member from above.

3. An internal gear shaving machine according to claim 2, wherein the shaving cutter and the workpiece carrying member each has an indexing element of the internal gear to enable the phasing of the shaving cutter and the internal gear held by the workpiece chuck.

4. An internal gear shaving machine according to claim 1, wherein the workpiece chuck is constituted to hold the internal gear with the gear's axis of rotation oriented vertically, and further has a workpiece carrying member for loading the internal gear to a workpiece change position positioned between the workpiece chuck and the shaving cutter and for unloading the internal gear from the workpiece change position, and the workpiece carrying member supports the internal gear with the gear's axis of rotation oriented vertically so the workpiece chuck can hold the internal gear on the workpiece carrying member from above.

5. An internal gear shaving machine according to claim 3, wherein the workpiece chuck is supported movably in the vertical direction, the workpiece carrying member comprising, a workpiece loading arm which has a first pivot axis parallel to the axis of rotation of the workpiece chuck and swings between a workpiece change position positioned on the travel path of the workpiece chuck in the vertical direction and a workpiece loading position laterally remote from the workpiece change position, and a workpiece unloading arm which has a second pivot axis parallel to the axis of rotation of the workpiece chuck and swings between the workpiece change position and a workpiece removing position laterally remote from the workpiece change position.

6. An internal gear shaving machine according to claim 4, wherein the shaving cutter and the workpiece carrying member each has an indexing element of the internal gear to enable the phasing of the shaving cutter and the internal gear held by the workpiece chuck.

7. An internal gear shaving machine according, to claim 1, wherein the shaving cutter is supported about the horizontal axis freely swingably to give the crossed axes angle with the axis of rotation of the internal gear.

8. An internal gear shaving machine according to claim 7, wherein the shaving cutter is supported freely horizontally movable to carry out an incision process on the internal gear at such a position that it enters the internal gear.

9. An internal gear shaving machine according to claim 7, wherein a main shaft which rotationally drives the workpiece chuck extends upwardly from the workpiece chuck, and a coolant feed hole which provides an internal gear to be processed with a coolant is formed inside the main shaft.

10. An internal gear shaving machine according to claim 1, wherein the shaving cutter is supported freely horizontally movable to carry out an incision process on the internal gear at such a position that it enters the internal gear.

11. An internal gear shaving machine according to claim 10, wherein a main shaft which rotationally drives the workpiece chuck extends upwardly from the workpiece chuck, and a coolant feed hole which provides an internal gear to be processed with a coolant is formed inside the main shaft.

12. An internal gear shaving machine according to claim 1, wherein a main shaft which rotationally drives the workpiece chuck extends upwardly from the workpiece chuck, and a coolant feed hole which provides an internal gear to be processed with a coolant is formed inside the main shaft.

13. An internal gear shaving machine according to claim 1, wherein the workpiece chuck is supported freely movably in the vertical direction, and the shaving cutter is supported movably in the horizontal direction.

14. An internal gear shaving machine according to claim 1 further having a workpiece carrying member which loads the internal gear in a workpiece change position positioned between the workpiece chuck and the shaving cutter and unloads the internal gear from the workpiece change position, the workpiece carrying member having a phasing mechanism which conducts the phasing of the internal gear loaded in the workpiece change position on the workpiece carrying member, the phasing mechanism having an inner diameter guide member which guides the inner periphery of the internal gear, a phasing pinion which engages the internal gear guided by the inner diameter guide member, a moving mechanism which moves the phasing pinion between a retracted position remote from the internal gear and an engaging position in which it engages the internal gear, and a rotating mechanism which rotates the phasing pinion engaged with the internal gear to a predetermined phase.

15. An internal gear shaving machine according to claim 14, wherein the workpiece carrying member has a workpiece loading arm which has a first pivot axis parallel to the axis of rotation of the workpiece chuck and swings between a workpiece change position positioned on the travel path of the workpiece chuck in the vertical direction and a workpiece loading position laterally remote from the workpiece change position, and the workpiece loading arm comprising the phasing mechanism.

16. An internal gear shaving machine according to claim 14, wherein the moving mechanism comprises a first linear actuator and the rotating mechanism comprises a second linear actuator, and a conversion mechanism which converts a linear reciprocating motion of a moving part of the second linear actuator into a rotary motion of a rotation shaft of the phasing pinion.

17. An internal gear shaving machine according to claim 16, wherein the conversion mechanism is a linkage which connects the second linear actuator and the rotation shaft of the phasing pinion.

18. An internal gear shaving machine according to claim 14, wherein the phasing mechanism comprises a sensor which detects if the phasing pinion is in such a position that engages the internal gear.

19. An internal gear shaving machine according to claim 14 further comprising a cutter positioning mechanism which stops the shaving cutter in a predetermined rotation angle position.

20. An internal gear shaving machine according to claim 19, wherein the workpiece chuck holds a workpiece whose phase is determined by the phasing mechanism, and is then controlled to rotate only to a preliminarily programmed rotation angle so that the workpiece engages the shaving cutter positioned by the cutter positioning mechanism.

21. An internal gear shaving machine according to claim 1 further having a workpiece stopper which comprises a bearing surface which receives an upper end face of the internal gear in the axial direction with the axis of rotation of the internal gear oriented in the vertical direction, and a seating sensor which detects seating of the internal gear on the bearing surface of the workpiece stopper.

22. An internal gear shaving machine according to claim 21, wherein the seating sensor comprises a through hole which opens onto the bearing surface of the workpiece stopper, and an air gap sensor which is communicably coupled with the through hole.

23. An internal gear shaving machine according to claim 22, wherein a main shaft which rotationally drives the workpiece chuck extends vertically; the workpiece chuck is a collet chuck; a pull stud which operates the collet chuck is removably connected to the drive shaft; the drive shaft is disposed so that the drive shaft passes through the inside of the main shaft in the axial direction of the main shaft and is supported freely movably upwardly and downwardly with respect to the main shaft; and the through hole is formed within the pull stud and the drive shaft which are in communication with each other.

24. An internal gear shaving machine according to claim 21, wherein a main shaft which rotationally drives the workpiece chuck extends vertically; the workpiece chuck is removably attached at the lower end of the main shaft; and a temporary rest which receives the workpiece chuck in a position over the shaving cutter is further provided.

25. An internal gear shaving machine according to claim 24, wherein the temporary rest has a rest body and legs provided thereon in a standing condition, and a shoulder for mounting the legs is formed on a shaft case of the shaving cutter.

26. An internal gear shaving machine according to claim 1, wherein the workpiece chuck is supported freely slidably in the vertical direction and supported on a support which is upwardly and downwardly driven by a lifting and lowering actuator, and is covered by a coolant splash guard cover covering the front, left and right sides of the workpiece chuck, and the coolant splash guard cover is supported on the support freely movably in the vertical direction.

27. An internal gear shaving machine according to claim 26, wherein the coolant splash guard cover is supported in such a manner that the lower end of the cover is movable beyond the lower end of the workpiece chuck.

28. An internal gear shaving machine according to claim 27, wherein a main shaft which rotationally drives the workpiece chuck extends in the vertical direction; a coolant tube passes through the main shaft in the axial direction and is supported non-rotatably about the main shaft's axis; and a coolant discharge opening is oriented in a predetermined direction.

29. An internal gear shaving machine according to claim 26, wherein a main shaft which rotationally drives the workpiece chuck extends in the vertical direction; a coolant tube passes through the main shaft in the axial direction and is supported non-rotatably about the main shaft's axis; and a coolant discharge opening is oriented in a predetermined direction.

* * * * *